(12) United States Patent
Vilagines et al.

(10) Patent No.: US 11,014,021 B1
(45) Date of Patent: May 25, 2021

(54) SYSTEMS AND METHODS FOR SEPARATING MULTI-PHASE COMPOSITIONS

(71) Applicant: Saudi Arabian Oil Company, Dhahran (SA)

(72) Inventors: Regis Didier Alain Vilagines, Dhahran (SA); Guillaume Robert Jean-Francois Raynel, Dhahran (SA); Fahd Ibrahim Alghunaimi, Dhahran (SA); Abdullah A. Alomier, Al Ahsa (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/695,668

(22) Filed: Nov. 26, 2019

(51) Int. Cl.
*B01D 17/02* (2006.01)
*B01D 21/26* (2006.01)
*B01D 71/02* (2006.01)

(52) U.S. Cl.
CPC ....... *B01D 17/0217* (2013.01); *B01D 21/267* (2013.01); *B01D 71/02* (2013.01);
(Continued)

(58) Field of Classification Search
CPC .. B04C 5/085; B04C 5/08; B04C 5/04; B04C 5/28; B04C 5/00; B04C 5/02;
(Continued)

(56) References Cited

U.S. PATENT DOCUMENTS 4,097,375 A    6/1978  Molitor
4,378,976 A    4/1983  Rush
(Continued)

FOREIGN PATENT DOCUMENTS

BR    202017009444 U2    11/2018
CN       200942363 Y     9/2007
(Continued)

OTHER PUBLICATIONS

Husveg et al. "Operational Control of Hydrocyclones During Variable Produced Water Flow Rates—Froy Case Study" Aug. 2007 SPE Production & Operations, 7 pgs.
(Continued)

*Primary Examiner* — Nam X Nguyen
*Assistant Examiner* — Ekandra S. Miller-Cruz
(74) *Attorney, Agent, or Firm* — Dinsmore & Shohl LLP

(57) ABSTRACT

Separators for separating a multi-phase composition include a separator casing defining a chamber and a permeate outlet, at least one hydrocyclone within the separator casing, and at least one ceramic membrane. Each hydrocyclone includes a hydrocyclone inlet, a tapered section downstream of the hydrocyclone inlet, an accepted outlet, and a reject outlet. The ceramic membrane may be disposed within the separator casing and downstream of the accepted outlet of the hydrocyclone or may be disposed within at least a portion of the tapered section of the hydrocyclone. The ceramic membrane includes a retentate side and a permeate side, where the permeate side is in fluid communication with the chamber. Systems and methods for separating a multi-phase composition into a lesser-density fluid, a greater-density fluid, and a medium-density fluid using the separators are also disclosed.

20 Claims, 13 Drawing Sheets

(52) U.S. Cl.
CPC ...... *B01D 2221/04* (2013.01); *B01D 2257/80* (2013.01); *B01D 2313/18* (2013.01)

(58) Field of Classification Search
CPC .. B04C 5/103; B04C 5/12; B04C 5/13; B04C 5/14; B04C 5/24; B01D 21/267; B01D 2221/00; B01D 45/00; B01D 21/262; B01D 17/0217; B01D 71/02; B01D 2313/18; B01D 2221/04; B01D 2257/80; B01D 61/16; B01D 61/20; B01D 2311/2676; B01D 2311/26; B01D 71/025; C02F 1/38; B03B 5/34; B03B 5/32
USPC .................................. 210/512.1, 787, 512.2
See application file for complete search history.

(56) References Cited

U.S. PATENT DOCUMENTS

| | | | |
|---|---|---|---|
| 4,504,285 A | 3/1985 | Modisette | |
| 5,478,484 A | 12/1995 | Michaluk | |
| 5,505,906 A * | 4/1996 | Engstrom | F23J 15/025 422/145 |
| 5,882,530 A | 3/1999 | Chase | |
| 5,996,690 A | 12/1999 | Shaw et al. | |
| 6,210,575 B1 | 4/2001 | Chase et al. | |
| 7,011,219 B2 | 3/2006 | Knox-Holmes et al. | |
| 7,632,416 B2 | 12/2009 | Levitt | |
| 8,182,684 B1 | 5/2012 | Wu | |
| 8,960,450 B2 | 2/2015 | Caffell et al. | |
| 2007/0039900 A1 | 2/2007 | Levitt | |
| 2014/0166576 A1 | 6/2014 | Hansen et al. | |
| 2015/0068975 A1 | 3/2015 | Krish | |
| 2015/0144091 A1 | 5/2015 | Erdmann et al. | |
| 2017/0158538 A1 | 6/2017 | Seth et al. | |
| 2018/0200733 A1 | 7/2018 | Kingsbury et al. | |
| 2019/0016611 A1 | 1/2019 | McLin et al. | |

FOREIGN PATENT DOCUMENTS

| | | |
|---|---|---|
| CN | 200987936 Y | 12/2007 |
| CN | 209302989 U | 8/2019 |
| EP | 1502652 A1 | 2/2005 |

OTHER PUBLICATIONS

Manison "Filtration Efficiency" WaterWorld, Aug. 28, 2013, https://www.waterworld.com/technologies/article/16212319/filtration-efficiency.

International Search Report and Written Opinion dated Oct. 26, 2020 pertaining to International application No. PCT/US2020/041098 filed Jul. 8, 2020, 15 pgs.

Office Action dated Feb. 5, 2021 pertaining to U.S. Appl. No. 16/695,669 filed Nov. 26, 2019, 37 pgs.

International Search Report and Written Opinion dated Mar. 2, 2021 pertaining to International application PCT/US2020/058625 filed Nov. 3, 2020, 14 pgs.

* cited by examiner

SYSTEMS AND METHODS FOR SEPARATING MULTI-PHASE COMPOSITIONS

TECHNICAL FIELD

The present disclosure generally relates to apparatus, systems, and methods for separating compositions comprising multiple phases, in particular, systems and methods of separating compositions that include an aqueous phase, an oleaginous phase, and a solid phase into a plurality of different streams having different densities.

BACKGROUND

Petroleum drilling, production, and/or refining can produce various mixed phase streams, such as produced water, that contain an aqueous phase, an oleaginous phase, and a solid phase in the form of solid particulates. Produced water is the largest mixed phase stream produced in the oil and gas industry and is produced in estimated amounts of 3:1 produced water to crude oil on a volume basis. The oleaginous phase of produced water and other mixed phase streams may include organic compounds, such as oils, phenolic compounds and other organic and inorganic contaminants. Many of these organic and inorganic contaminants must be removed from the aqueous streams before the water from these aqueous streams can be reused in drilling operations and refining processes or directed to downstream treatment processes. Additionally, solid components of the produced water or other mixed phase stream are also generally removed prior to reuse in drilling and refining operations or treatment in a downstream treatment process.

SUMMARY

Multi-phase compositions, such as produced water, may be separated into one or more streams by various techniques, which may include gravity oil separation (settling), membrane separation, filtering, gas flotation, centrifugal separation, hydrocyclonic separation, distillation, or other separation processes. Membrane separation or filtration processes may provide for efficient separation of solid particles from multi-phase compositions. However, membranes and filters can be susceptible to bio-fouling from the oleaginous constituents and organic compounds. Bio-fouling of membranes and filters can result in constant replacement of membranes and filters. Hydrocyclones can be used to remove oil droplets and other organic compounds from multi-phase compositions, but are ineffective at efficiently removing solid particles. Other separator systems, such as gravity oil separators, gas flotation systems, and distillation systems can have substantial space requirements. Additionally, systems combining multiple separation units in series or parallel may also have large space requirements. The space requirements of certain separation unit operations and combinations of separation equipment may be impractical for applications with limited physical space, such as well-drilling operations, in particular well-drilling platforms for underwater drilling. Many physical separation devices may also be limited in the size range of oil droplets that are able to be removed from multi-phase compositions.

Accordingly, ongoing needs exist for improved apparatus, systems, and methods for separating multi-phase compositions. In particular, ongoing needs exist for apparatus and systems that have a reduced size footprint compared to existing separation processes and are capable of separating a multi-phase composition into a plurality of streams with reduced bio-fouling that can disrupt operation of the separation equipment. The separators and separator systems of the present disclosure include a separator casing, one or a plurality of hydrocyclones, and one or a plurality of ceramic membranes, where the hydrocyclones and the ceramic membranes are disposed within the separator casing. The ceramic membranes may be disposed downstream of an accepted outlet of the hydrocyclone or may be integrated into a tapered section of the hydrocyclone. The separator having one or more ceramic membranes integrated with a hydrocyclone may be operable to separate a multi-phase composition into at least a lesser-density fluid, a medium-density fluid, and a greater-density fluid. The separators of the present disclosure may have a reduced size footprint and reduced bio-fouling compared to existing separation equipment and processes. The separators and separator systems of the present disclosure may also be capable to producing a medium-density fluid comprising water that may meet or exceed water quality specifications for re-use of the water in hydrocarbon drilling, production, and refining operations, among other capabilities that are or may become apparent from the present disclosure.

According to one or more aspects of the present disclosure, a separator may include a separator casing defining a chamber and having a permeate outlet, at least one hydrocyclone disposed within the separator casing, and at least one ceramic membrane disposed within the separator casing and downstream of an accepted outlet of the hydrocyclone. The at least one hydrocyclone may include a hydrocyclone inlet, a tapered section downstream of the hydrocyclone inlet, a reject outlet proximate a wide end of the tapered section, and an accepted outlet proximate a narrow end of the tapered section. The ceramic membrane may include at least one cylindrical tube, a membrane inlet, a retentate outlet, a retentate side defining the at least one cylindrical tube, and a permeate side, where the permeate side is in fluid communication with the chamber.

According to one or more other aspects of the present disclosure, a separator system may include a separator. The separator may include a separator casing defining a chamber and having a permeate outlet, at least one hydrocyclone disposed within the separator casing and having an accepted outlet and a reject outlet, and at least one ceramic membrane disposed within the separator casing and downstream of the accepted outlet of the hydrocyclone, the ceramic membrane comprising at least one cylindrical tube, a membrane inlet, a retentate outlet, a retentate side defining the at least one cylindrical tube, and a permeate side, where the permeate side is in fluid communication with the chamber. The separator system may further include at least one pressure sensor operatively coupled to the hydrocyclone inlet, the reject outlet, the membrane inlet, the retentate outlet of the ceramic membrane, or the separator casing. The separator system may further include at least one control valve operatively coupled to a permeate outlet or a greater-density fluid outlet of the separator casing, at least one processor communicatively coupled to the at least one pressure sensor and the at least one control valve, and at least one memory module communicatively coupled to the processor.

According to one or more other aspects of the present disclosure, a method of separating a multi-phase composition having an aqueous phase, an oleaginous phase, and a solid phase, may include passing the multi-phase composition to a separator operable to separate the multi-phase composition into a lesser-density fluid, a medium-density fluid, and a greater-density fluid. The separator may include a separator casing defining a chamber and having a permeate outlet, at least one hydrocyclone disposed within the separator casing and having an accepted outlet and a reject outlet, and at least one ceramic membrane disposed within the separator casing and downstream of the accepted outlet of the hydrocyclone, the ceramic membrane comprising at least one cylindrical tube, a membrane inlet, a retentate outlet, a retentate side defining the at least one cylindrical tube, and a permeate side, where the permeate side is in fluid communication with the chamber.

Additional features and advantages of the present disclosure will be set forth in the detailed description that follows, and in part will be readily apparent to those skilled in the art from that description or recognized by practicing the described subject matter, including the detailed description that follows, the claims, as well as the appended drawings.

BRIEF DESCRIPTION OF THE DRAWINGS

The following detailed description of specific aspects of the present disclosure can be best understood when read in conjunction with the following drawings, in which like structure is indicated with like reference numerals and in which.

Figure 1:
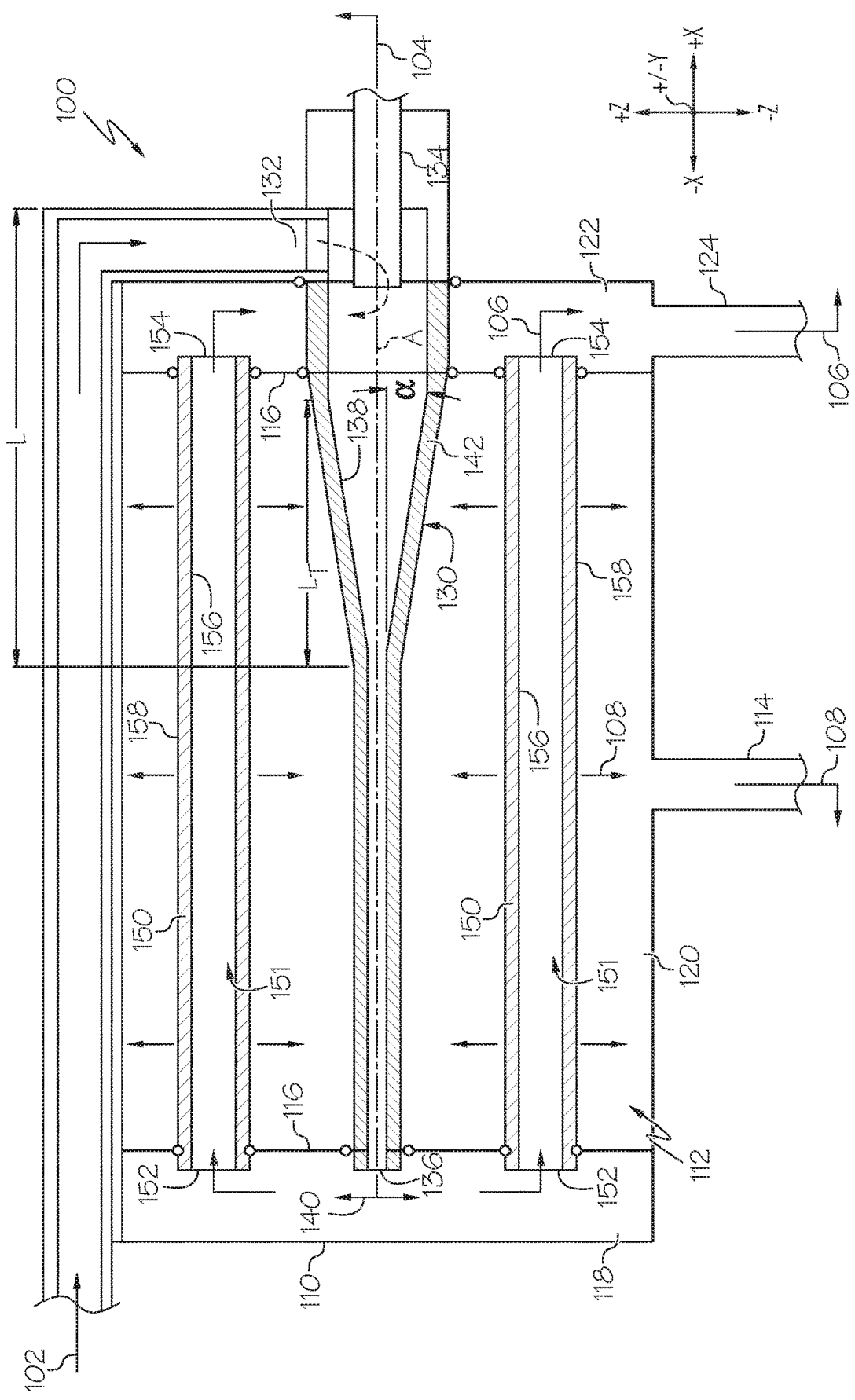
FIG. 1 schematically depicts a separator for separating a multi-phase composition, according to one or more embodiments shown and described in the present disclosure.

For purposes of describing the simplified schematic illustrations and descriptions in FIGS. 1-10, the numerous valves, temperature sensors, flow meters, pressure regulators, electronic controllers, pumps, and the like that may be employed and well known to those of ordinary skill in the art of certain chemical and oilfield processing operations may not be depicted. Further, accompanying components that are often included in typical chemical and oilfield processing operations, such as valves, pipes, pumps, agitators, heat exchangers, instrumentation, internal vessel structures, or other subsystems may not be depicted. Though not depicted, it should be understood that these components are within the spirit and scope of the present embodiments disclosed. However, operational components, such as those described in the present disclosure, may be added to the embodiments described in this disclosure.

Arrows in the drawings refer to process streams. However, the arrows may equivalently refer to transfer lines, such as pipes or conduits, which may serve to transfer process streams between two or more system components. Additionally, arrows that connect to system components may define inlets or outlets in each given system component. The arrow direction corresponds generally with the major direction of movement of the materials of the stream contained within the physical transfer line signified by the arrow. Furthermore, arrows which do not connect two or more system components may signify a product stream which exits the depicted system component or a system inlet stream which enters the depicted system or system component.

Additionally, arrows in the drawings may schematically depict process steps of transporting a stream or composition from one system component to another system component. For example, an arrow from one system component pointing to another system component may represent "passing" a stream or composition to another system component, which may include the contents of a process stream "exiting" or being "removed" from one system component and "introducing" the contents of that product stream to another system component.

Reference will now be made in greater detail to various aspects of the present disclosure, some aspects of which are illustrated in the accompanying drawings.

DETAILED DESCRIPTION

Figure 5:
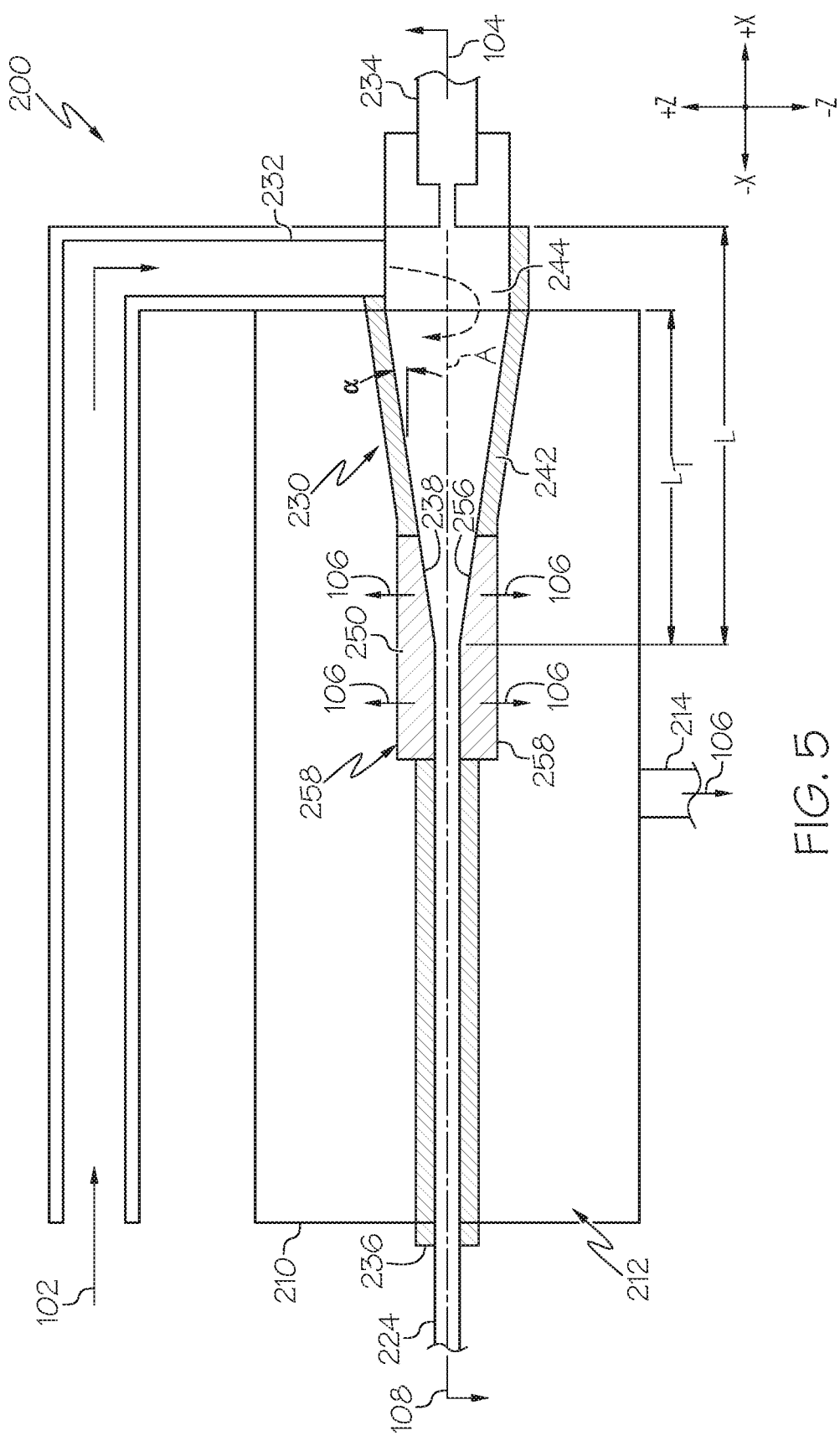
FIG. 5 schematically depicts another embodiment of a separator, according to one or more embodiments shown and described in the present disclosure.

The present disclosure is directed to separators, separator systems, and methods for separating multi-phase compositions, such as produced water, into a plurality of fluids of different densities. Referring to FIG. 1, an embodiment of a separator 100 of the present disclosure is schematically depicted. The separators 100 of the present disclosure may include a separator casing 110 defining a chamber 112 and having a permeate outlet 114. The separators 100 may also include one or a plurality of hydrocyclones 130 disposed within the separator casing 110. Each of the hydrocyclones 130 may include a hydrocyclone inlet 132, a tapered section 138 downstream of the hydrocyclone inlet 132, a reject outlet 134 proximate a wide end of the tapered section 138, and an accepted outlet 136 proximate the narrow end of the tapered section 138. The separator 100 may also include one or a plurality of ceramic membranes 150 disposed within the separator casing 110. The ceramic membrane(s) 150 may include one or a plurality of cylindrical tubes 151, a membrane inlet 152, a retentate outlet 154, a retentate side 156 defining the cylindrical tubes 151, and a permeate side 158. The permeate side 158 may be in fluid communication with the chamber 112. The ceramic membranes 150 may be disposed downstream of the accepted outlet 136 of the hydrocyclone 130. Referring to FIG. 5, another embodiment of a separator 200 of the present disclosure is depicted in which a ceramic membrane 250 can be integrated into a tapered section 238 of a hydrocyclone 230 such that the ceramic membrane 250 forms the walls 242 of the hydrocyclone 230 in at least a portion of the tapered section 238. The present disclosure also includes separator systems that include pressure differential control, flowrate control, or both, of the separators 100, 200.

The separators 100, 200 and separator systems of the present disclosure may be operable to separate a multi-phase composition 102, such as produced water, having an aqueous phase, an oleaginous phase, and solids, into at least a lesser-density fluid 104, a greater-density fluid 106, and a medium-density fluid 108. The cyclonic flow produced in the hydrocyclone 130, 230 may be operable to separate an oleaginous phase from the multi-phase composition 102, which may be passed out of the hydrocyclone 130, 230 from the reject outlet 134, 234. Cyclonic flow in the hydrocyclone 130, 230 and removal of the oleaginous components of the multi-phase composition 102 may reduce bio-fouling of the ceramic membranes 150, 250, whether downstream of the hydrocyclone 130 or integrated into the tapered section 238 of hydrocyclone 230. The separators 100, 200 and separator systems of the present disclosure may be operable to separate a greater range of oil droplet sizes from the multi-phase composition 102 compared to existing commercially-available separation processes. The separators 100, 200 of the present disclosure integrating the hydrocyclone 130, 230 and ceramic membrane 150, 250 into a single separator casing 110, 210 may have a compact footprint to enable use of the separators 100, 200 in locations with limited space requirements, such as drilling platforms or other operations.

The term "or", as used in the present disclosure, is inclusive; more specifically, the phrase "A or B" means "A, B, or both A and B." Exclusive "or" is designated in the present disclosure by terms such as "either A or B" and "one of A or B," for example.

The indefinite articles "a" and "an" are employed to describe elements and components of the present disclosure. The use of these articles means that one or at least one of these elements or components is present. Although these articles are conventionally employed to signify that the modified noun is a singular noun, as used herein the articles "a" and "an" also include the plural, unless otherwise stated in specific instances. Similarly, the definite article "the", as used in the present disclosure, also signifies that the modified noun may be singular or plural, again unless otherwise stated in specific instances.

As used in the present disclosure, the terms "upstream" and "downstream" refer to the positioning of components of the separator 100, 200 relative to the direction of flow of materials through the separator 100, 200. For example, a first component may be considered "upstream" of a second component if materials flowing through the separator 100, 200 encounter the first component before encountering the second component. Likewise, the second component is considered "downstream" of the first component if the materials flowing through the separator 100, 200 encounter the first component before encountering the second component.

As used in the present disclosure, the term "fluid" may be used to refer to a flowable composition that includes gases, one or a plurality of liquids, or mixtures of liquids with gases, solids, or both. Fluids can include, but are not limited to, liquids and liquid mixtures, gas-liquid emulsions, liquid-liquid emulsions, dispersions, solutions, and suspensions.

As used in the present disclosure, the term "multi-phase composition" may refer to a composition that includes two or more phases, which may include, but are not limited to, solids, gases, and one or more liquid phases. The liquid phases may include one or more immiscible liquid phases, such as an aqueous phase and an oleaginous phase.

As used in the present disclosure, the term "permeate" may refer to the materials that pass through a ceramic membrane from the retentate side to the permeate side. The term "permeate" is not intended to imply any particular mass transport phenomenon or mechanism, such as but not limited to diffusion, osmosis, filtration, or other such mechanism.

As used in the present disclosure, the term "reject outlet" may refer to the outlet of a hydrocyclone from which the lesser-density constituents of the multi-phase composition exit the hydrocyclone. The term "accepted outlet" may refer to the outlet of the hydrocyclone from which the constituents other than the lesser-density constituents of the multi-phase composition exit the hydrocyclone.

Referring again to FIG. 1, the separators 100 of the present disclosure may include the separator casing 110, at least one hydrocyclone 130 disposed within the separator casing 110, and at least one ceramic membrane 150 disposed within the separator casing 110 and downstream of the hydrocyclone 130. The separator casing 110 may define a chamber 112 and may include a permeate outlet 114. The hydrocyclones 130 and the ceramic membranes 150 may be disposed within the chamber 112 defined by the separator casing 114.

The hydrocyclone 130 may be a mechanical device operable to separate lesser-density constituents of the multi-phase composition 102, such as but not limited to oil droplets, from the greater-density constituents of the multi-phase composition 102, such as solid particles, water, salts, or other aqueous constituents. The multi-phase composition 102 may include a plurality of phases, such as 2, 3, 4, or more than 4 phases. The multi-phase composition 102 may include a gaseous phase, one or more liquid phases, a solid phase, or combinations of these. In one or more embodiments, the multi-phase composition 102 may include an aqueous phase comprising primarily water and water-soluble constituents, an oleaginous phase comprising primarily oil droplets and other organic compounds, and a solid phase comprising solid particles, such as suspended solids. In one or more embodiments, the multi-phase composition 102 may be produced water that includes an aqueous phase, an oleaginous phase comprising at least oil droplets, and a solid phase comprising at least suspended solids. Embodiments of the separators 130 of the present disclosure are described in the context of treating produced water from hydrocarbon drilling, production, and refining. However, it is understood that the separators 130 of the present disclosure may be applied to various other multi-phase compositions.

The hydrocyclone 130 may operate by generating a cyclonic or vortex flow that creates centrifugal forces within the multi-phase composition 102. The centrifugal forces may cause the greater-density constituents of the multi-phase composition 102 to travel or migrate radially outward from a center axis A of the hydrocyclone 130 towards the walls 142 of the hydrocyclone 130. The hydrocyclone 130 may include a cylindrical inlet chamber 144 and the tapered section 138 downstream of the cylindrical inlet chamber 144. The tapered section 138 may be frusto-conical in shape having a wide end and a narrow end, where the wide end has a greater diameter than the narrow end. The wide end may be disposed at an upstream end of the tapered section 138, and the narrow end may be disposed downstream of the wide end of the tapered section 138. The wide end of the tapered section 138 may be coupled to the cylindrical inlet chamber 144. The tapered section 138 may be defined by a cone angle α and a length LT of the tapered section 238. The cone angle α, length LT of the tapered section 238, and overall length L of the hydrocyclone 130 may be selected based on the characteristics and composition of the multi-phase composition 102.

The hydrocyclone 130 may include a hydrocyclone inlet 132. The hydrocyclone inlet 132 may be coupled to the cylindrical inlet chamber 144 and may be configured to introduce the multi-phase composition 102 to the hydrocyclone 130 in a manner that creates the cyclonic flow in the hydrocyclone 130. The hydrocyclone inlet 132 may be tangent to the inner cylindrical surface of the cylindrical inlet chamber 144. In one or more embodiments, the hydrocyclone inlet 132 may be coupled to the cylindrical inlet chamber 144 so that the hydrocyclone inlet 132 is generally parallel with a plane that is tangent to the cylindrical inlet chamber 144.

The reject outlet 134 of the hydrocyclone 130 may be in fluid communication with the cylindrical inlet chamber 144 of the hydrocyclone 130 and may be aligned with and centered on the center axis A of the hydrocyclone 130. The reject outlet 134 may be coupled to the cylindrical inlet chamber 144 at an end opposite the tapered section 138. The reject outlet 134 may include an open-ended conduit or tube that extends at least partially into the cylindrical inlet chamber 144. The open-ended conduit may reduce or prevent the multi-phase composition 102 introduced to the hydrocyclone 130 from flowing directly into the reject outlet 134 without being subjected to the cyclonic flow within the hydrocyclone 130. The accepted outlet 136 of the hydrocyclone 130 may be positioned at the narrow end of tapered section 138, the narrow end being at a distal end of the tapered section 138 relative to the cylindrical inlet chamber 144. In other words, accepted outlet 136 of the hydrocyclone 130 may be positioned at a downstream end of the tapered section 138 relative to the upstream end, which is coupled to the cylindrical inlet chamber 144. The accepted outlet 136 may be aligned with and centered on the center axis A of the hydrocyclone 130.

Figure 2:
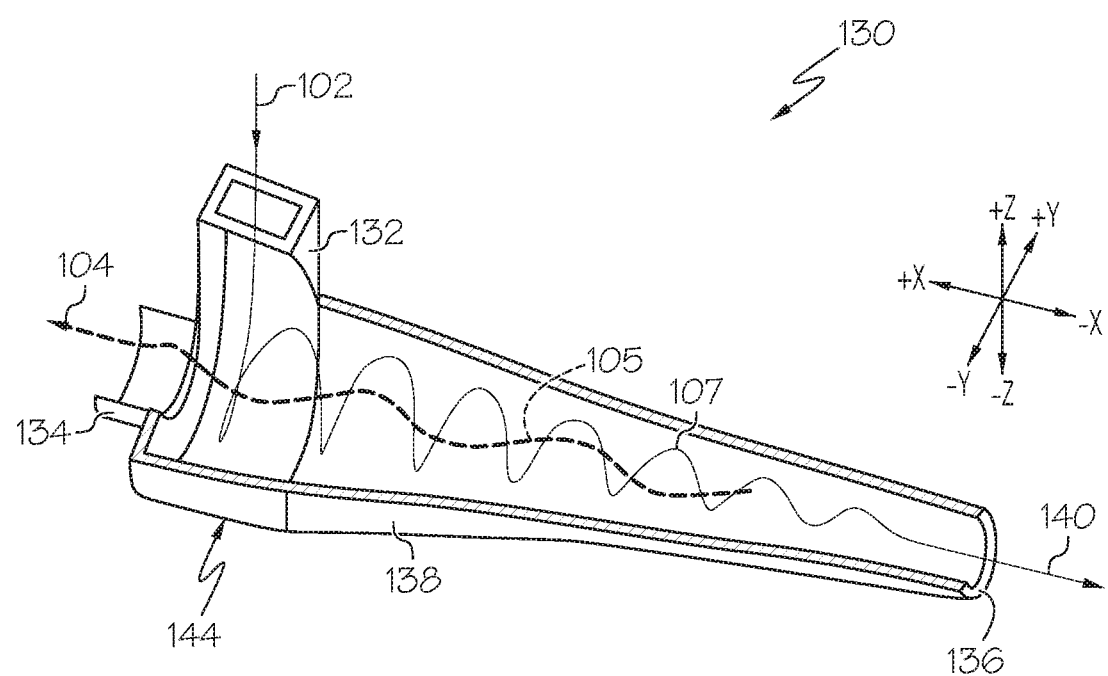
FIG. 2 schematically depicts operation of a hydrocyclone, in partial sectional view, of the separator of FIG. 1, according to one or more embodiments shown and described in the present disclosure.

The hydrocyclone 130 may be operable to separate the multi-phase composition 102, which may include a solid phase, an aqueous phase, and an oleaginous phase, into a lesser-density fluid 104 and an intermediate fluid stream 140. Referring now to FIG. 2, operation of the hydrocyclone 130 is schematically depicted. The multi-phase composition 102 may be introduced tangentially to the cylindrical inlet chamber 144 of the hydrocyclone 130 through the hydrocyclone inlet 132. The tangential orientation of the hydrocyclone inlet 132 relative to the cylindrical inlet chamber 144 may cause the multi-phase composition 102 to flow along the walls of the cylindrical inlet chamber 144 to create cyclonic flow. At the tapered section 138, the cross-sectional area of the hydrocyclone 130 decreases, which accelerates the multi-phase composition 102 in the cyclonic flow and generates greater centrifugal forces within the multi-phase composition 102. The increased centrifugal forces caused by the acceleration of the fluid in the tapered section 138 may cause the greater-density constituents of the multi-phase composition 102 to travel radially outward towards the walls 142 of the hydrocyclone 130 and may cause the lesser-density constituents of the multi-phase composition 102 to travel radially inward towards the center axis A of the hydrocyclone 130. The greater-density constituents may include, but are not limited to, solids and aqueous phase constituents having a greater density than the lesser-density constituents. The lesser-density constituents may include oil droplets and other organics having a lesser density than the greater-density constituents.

The greater-density constituents may travel in a primary vortex flow along the walls 142 of the tapered section 138 downstream towards the accepted outlet 136 (in the −X direction of the coordinate axis of FIG. 2). The primary vortex flow of the greater-density constituents within the hydrocyclone 130 is indicated in FIG. 2 with reference number 107. The lesser-density constituents may form a secondary vortex 105 at the center of the hydrocyclone 130. The secondary vortex 105 may create flow of the lesser-density constituents in a direction opposite the primary vortex flow 107. The secondary vortex 105 may create flow of the lesser-density constituents towards the reject outlet 134 of the hydrocyclone 130 (+X direction of the coordinate axis of FIG. 2).

Referring to FIGS. 1 and 2, the lesser-density constituents may pass out of the hydrocyclone 130 from the reject outlet 134 as the lesser-density fluid 104. The lesser-density fluid 104 may have a greater concentration of oil droplets, organic compounds, or both, compared to the multi-phase composition 102. The lesser-density fluid 104 may have a lesser concentration of suspended solids, water, and aqueous constituents relative to the multi-phase composition 102. The greater-density constituents may pass out of the hydrocyclone 130 from the accepted outlet 136 as an intermediate fluid stream 140. The intermediate fluid stream 140 may include an increased concentration of solids, water, and aqueous constituents compared to the multi-phase composition 102 and the lesser-density fluid 104. The intermediate fluid 140 may be a mixture of the greater-density fluid 106 and the medium-density fluid 108, which may be subsequently separated by the downstream ceramic membranes 150. The intermediate fluid 140 may have a concentration of oil droplets and other organic constituents that is less than the concentration of oil droplets and organic constituents in the multi-phase composition 102, the lesser-density fluid 104, or both. The reduced concentration of the oleaginous components in the intermediate fluid 140 may reduce biofouling of the ceramic membranes 150 downstream of the hydrocyclone 130.

Figure 13:
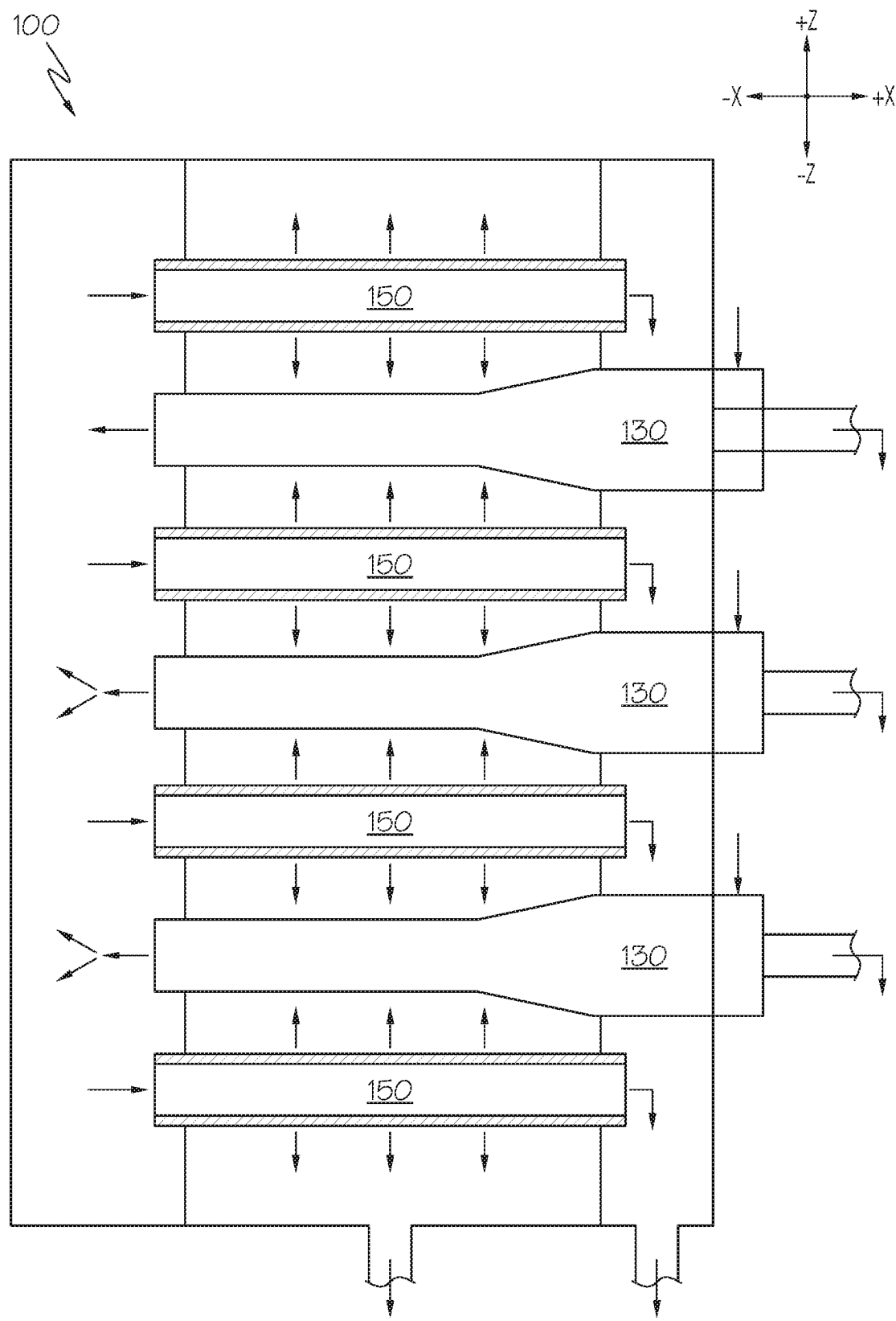
FIG. 13 schematically depicts a separator having a plurality of hydrocyclones and a plurality of ceramic membranes, according to one or more embodiments shown and described in the present disclosure.

For ease of illustration and description, the separator 100 of the present disclosure is described in the context of a having a single hydrocyclone 130. However, it is understood that any of the separators 100 of the present disclosure may include a plurality of hydrocyclones 130 disposed within the separator casing 110. Referring now to FIG. 13, the separator 100 may have a plurality of hydrocyclones 130, such as 2, 3, 4, 5, 6, or more than 6 hydrocyclones 130 disposed within the separator casing 110. Such a layout may enable a number of hydrocyclones 130 to operate in parallel using the same process conditions, thus, increasing the flow capacity of the separator 100 while reducing the spatial footprint and the costs associated with manufacturing and site installation. In one or more embodiments, the separator 100 may include up to several dozen hydrocyclones 130 disposed within the separator casing 110.

Referring again to FIG. 1, the separator 100 may include at least one ceramic membrane 150 disposed within the separator casing 110. The separator 100 may include one or more than one ceramic membrane 150, such as 1, 2, 3, 4, 5, 6, or more than 6 ceramic membranes 150. Increasing the number of ceramic membranes 150 may be operable to increase the flowrate of the intermediate fluid stream 140 through the separator 100 by increasing the total surface area of the ceramic membranes 150. The ceramic membranes 100 may be disposed downstream of the accepted outlet 136 of the hydrocyclone 130. Each of the ceramic membranes 150 may include one or a plurality of cylindrical tubes 151 passing through the ceramic membrane 150 from a membrane inlet 152 to a retentate outlet 154. Each ceramic membrane 150 may include 1, 2, 3, 4, 5, or more than 5 cylindrical tubes 151. The cylindrical tubes 151 of the ceramic membrane 150 may be defined by the retentate side 156 of the ceramic membrane 150. The retentate side 156 may be the surfaces of the ceramic membrane 150 oriented toward the center of each of the cylindrical tubes 151 of the ceramic membrane 150 in a direction radially inward from the permeate side 158. The ceramic membrane 150 may have a permeate side 158, which may be an outer surface of the ceramic membrane 150. The permeate side 158 may be in fluid communication with the chamber 112. The combination of the number of ceramic membranes 150, the number of cylindrical tubes 151 per ceramic membrane 150, and the inner diameter of the cylindrical tubes 151 may be selected based on the inlet flowrate of the multi-phase composition so that the linear speed of the intermediate fluid 140 through the cylindrical tubes 151 defined by the ceramic membranes 130 may be in a range of from 3 meters per second (m/s) to 5 m/s.

The membrane inlets 152 of the at least one ceramic membrane 150 may be in fluid communication with the accepted outlet 136 of the hydrocyclone 150. In one or more embodiments, the separator 100 may include a plurality of ceramic membranes 150 disposed within the separator casing 110 and the membrane inlet 152 of each of the plurality of ceramic membranes 150 may be in fluid communication with the accepted outlet 136 of the hydrocyclone 130 or plurality of hydrocyclones 130. As used in the present disclosure, the term "in fluid communication" may refer to a relationship between two components of the separator 100 in which a fluid can be passed from one component directly to the second component without passing the fluid first through a third component that changes the composition or characteristics of the fluid. The permeate side 158 of each of the plurality of ceramic membranes 150 may be in fluid communication with the chamber 112 defined by the separator casing 110. The ceramic membranes 150 may be oriented within the separator casing 110 so that the flow of the intermediate stream 140 through the cylindrical tubes 151 of the ceramic membranes 150 is in a direction parallel to but opposite from the direction of flow through the hydrocyclone 130 (in the +X direction of the coordinate axis in FIG. 1). Alternatively, the ceramic membranes 150 may also be oriented so that the direction of flow through the ceramic membranes 150 is in the same direction as the flow through the hydrocyclone 130 (−X direction of the coordinate axis of FIG. 1) or non-parallel relative to the direction of flow through the hydrocyclone 130.

The retentate outlets 154 of each of the ceramic membranes 150 may be in fluid communication with a greater-density fluid outlet 124 of the separator casing 110. In one or more embodiments, the separator 100 may include a single greater-density fluid outlet 124 and each retentate outlet 154 of the plurality of ceramic membranes 150 may be in fluid communication with the greater-density fluid outlet 124. In other embodiments, the separator 100 may include a plurality of greater-density fluid outlets 124 and the retentate outlet 154 of each of the ceramic membranes 150 may be in fluid communication with one of the plurality of greater-density fluid outlets 124. The retentate outlet 154 of each of the ceramic membranes 150 may be fluidly coupled to one of the greater-density fluid outlets 124 by a conduit (not shown). In one or more embodiments, the retentate outlet 154 of each of the ceramic membranes 150 may be fluidly coupled to a manifold (not shown), and the manifold may be fluidly coupled to the greater-density fluid outlet 124.

For the separator 100, the ceramic membranes 150 may be ultrafiltration or nanofiltration membranes operable to enable the water and water-soluble constituents of the intermediate fluid 140 to pass through ceramic membrane 150 from the retentate side 156 to the permeate side 158, while reducing or preventing passage of solids through the ceramic membrane 150. The ceramic membranes 150 may have an average pore size sufficient to reduce or prevent passage of solid particles through the ceramic membranes 150. The ceramic membranes 150 of the separator 100 may have an average pore size of less than or equal to 0.5 micrometer (μm), less than 0.25 μm, or even less than or equal to 0.1 μm. The average pore size may be determined through thermoporometry using differential scanning calorimetry (DSC), among other methods. The ceramic membranes 150 of the separator 100 may have an average pore size of greater than or equal to 0.005 μm, greater than or equal to 0.01 μm, or even greater than or equal to 0.05 μm. The at least one ceramic membrane 150 may have an average pore size of from 0.005 μm to 0.5 μm, from 0.005 μm to 0.25 μm, from 0.005 μm to 0.1 μm, from 0.01 μm to 0.5 μm, from 0.01 μm to 0.25 μm, from 0.01 μm to 0.1 μm, from 0.05 μm to 0.5 μm, from 0.05 μm to 0.25 μm, or from 0.05 μm to 0.1 μm.

Referring to FIG. 1, the ceramic membranes 150 may be operable to separate the intermediate fluid 140 into a greater-density fluid 106 and a medium-density fluid 108. As the intermediate fluid 140 passes into and through each of the ceramic membranes 150, at least a portion of the intermediate fluid 140 may permeate into and through the walls of the ceramic membrane 150 from the retentate side 156 to the permeate side 158. The portion of the intermediate fluid 140 passing through the ceramic membrane 150 may pass into the chamber 112 of the separator casing 110 as the permeate. The permeate may be the medium-density fluid 108. The medium-density fluid 108 may fill the chamber 112 of the separator casing 110 and may be passed out of the separator casing 110 through the permeate outlet 114. The medium-density fluid 108 may be substantially free of solids. As used in this disclosure, the term "substantially free" of a constituent means less than 1 weight percent (wt. %) of that component in a particular portion of a composition, such as the multi-phase composition 102, lesser-density fluid 104, greater-density fluid 106, medium density fluid 108, or intermediate fluid 140. As an example, the medium-density fluid 108 that is substantially free of solids may have less than 1 wt. % solids based on the total weight of the medium-density fluid 108.

The remaining portions of the intermediate fluid 140, including the greatest portion of the solids, continue through the cylindrical tubes 151 of the ceramic membranes 150 to the retentate outlets 154 of the ceramic membranes 150. The remaining portions of the intermediate fluid 140 may comprise the greater-density fluid 106. The greater-density fluid 106 may be passed out of the retentate outlets 154 of the ceramic membranes 150 and out of the separator 100 through the one or more greater-density fluid outlets 124. The greater-density fluid 106 may have a concentration of solids greater than the concentration of solids in the intermediate fluid 140 and the medium-density fluid 108.

Referring again to FIG. 1, the separator casing 110 may include one or a plurality of internal walls 116. The internal walls 116 may divide the chamber 112 into a plurality of compartments 118, 120, 122. Each of the compartments may be fluidly isolated from the other compartments by the internal walls 116. The separator casing 110 may include 1, 2, 3, 4, or more than 4 internal walls 116 dividing the chamber 112 into 2, 3, 4, 5, or more than 5 compartments, respectively. In one or more embodiments, the separator casing 110 may include at least one internal wall 116 that may divide the chamber 116 into at least a first compartment 118 and a second compartment 120. The first compartment 118 may be in fluid communication with the accepted outlet 136 of the hydrocyclone 130, the membrane inlets 152 of the ceramic membranes 150, or both. The first compartment 118 may provide a first flow path for direct fluid communication between the accepted outlet 136 of the hydrocyclone 130 and the membrane inlets 152 of the ceramic membranes 150. Thus, the first flow path provided by the first compartment 118 may fluidly couple the accepted outlet 136 of the hydrocyclone 130 to the membrane inlets 152 of the ceramic membranes 150.

The second compartment 120 may include the permeate outlet 114 and may be in fluid communication with the permeate side 158 of the ceramic membrane 150. The second compartment 120 may provide a second flow path for direct fluid communication between the permeate sides 158 of the ceramic membranes 150 and the permeate outlet 114. Thus, the permeate outlet 114 of the separator casing 110 may be in fluid communication with the permeate sides 158 of the ceramic membranes 150 by way of the second flow path in the second compartment 120.

The separator casing 110 may also include a third compartment 122, which may be separated from the second compartment 120 by another of the internal walls 116 of the separator casing 110. The third compartment 122 may be in fluid communication with the retentate outlets 154 of each of the ceramic membranes 150. The third compartment 122 may include the greater-density fluid outlet 124. The third compartment 122 may provide a third flow path for direct fluid communication between the retentate outlets 154 of the ceramic membranes 150 with the greater-density fluid outlet 124. Thus, the third flow path provided by the third compartment 122 may fluidly couple the retentate outlet 154 of each of the ceramic membranes 150 with the greater-density fluid outlet 124.

Referring again to FIG. 1, in operation of the separator 100, the multi-phase composition 102 may be introduced to the hydrocyclone 130 through the hydrocyclone inlet 132. The hydrocyclone 130 may be operable to produce a cyclonic flow, which may separate the multi-phase composition 102 into the lesser-density fluid 104 and an intermediate fluid 140. The lesser-density fluid 104 may be passed out of the separator 100 through the reject outlet 134 of the hydrocyclone 130. The intermediate fluid 140 may pass out of the hydrocyclone 130 through the accepted outlet 136. The intermediate fluid 140 may pass into the first compartment 118 and through the first compartment 118 to the membrane inlet 152 of each of the ceramic membranes 150. The intermediate fluid 140 may flow through the ceramic membranes 150. A portion of the intermediate fluid 140, such as water and certain aqueous constituents, may pass through the porous walls of the ceramic membranes 150 from the retentate side 156 to the permeate side 158 and into the second compartment 120 to produce the medium-density fluid 108. The medium-density fluid 108 may completely fill the second compartment 120 and may be passed out of the separator 100 through the permeate outlet 114. The retained portions of the intermediate fluid 140 may continue through the cylindrical tubes 151 and may pass out of the ceramic membranes 150 through the retentate outlets 154 to produce the greater-density fluid 106. The greater-density fluid 106 may be passed out of the separator 100 through the greater-density fluid outlet 124.

Figure 3:
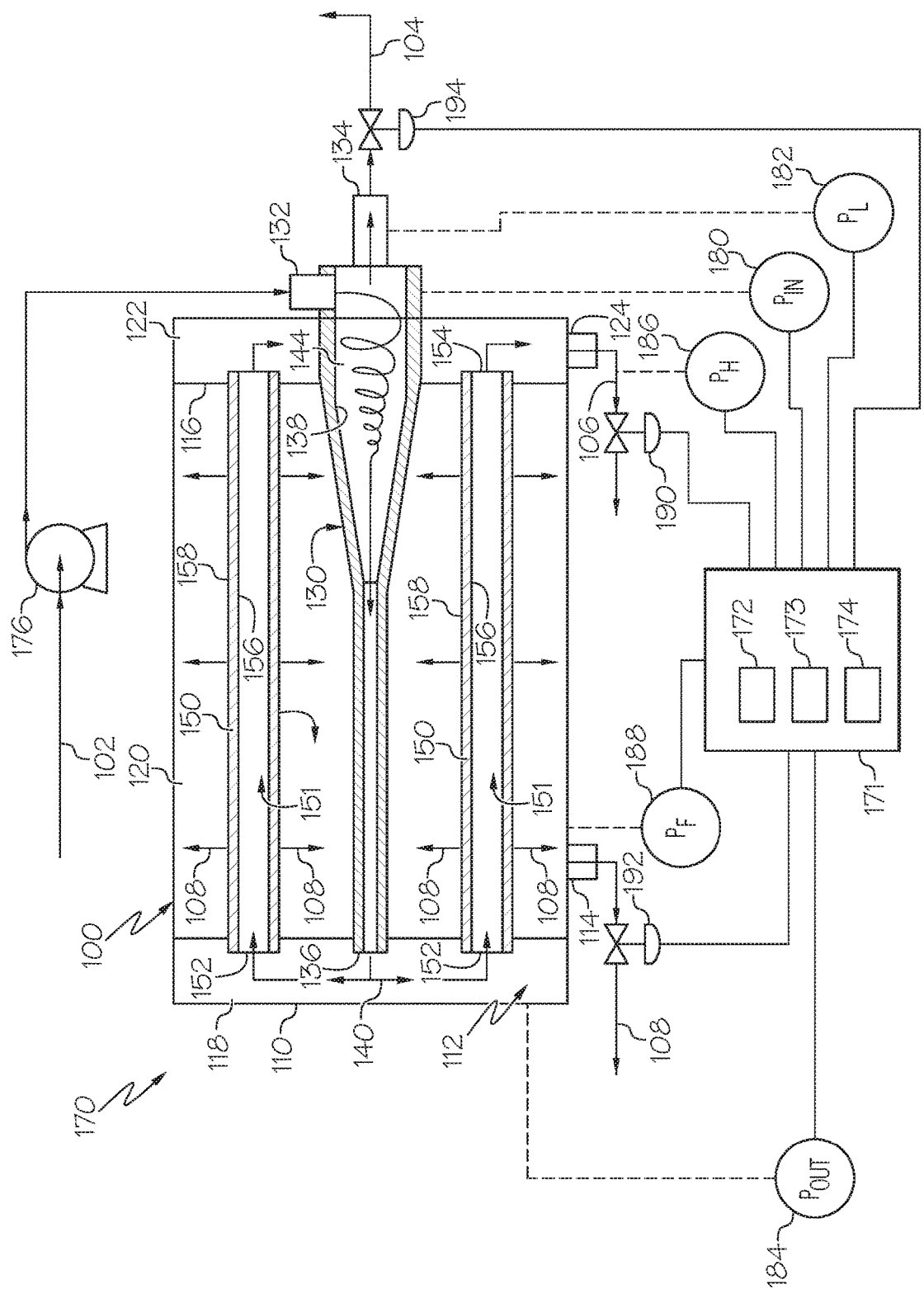
FIG. 3 schematically depicts a separator system comprising the separator of FIG. 1, according to one or more embodiments shown and described in the present disclosure.

Referring now to FIG. 3, the separator 100 may be incorporated into a separator system 170. The separator system 170 may include the separator 100, which may have any of the features or attributes previously described in the present disclosure for separator 100. The separator system 170 may include at least one pressure sensor 180, 182, 184, 186, 188, at least one control valve 190, 192, 194, at least one processor 172 communicatively coupled to the pressure sensor and the control valve, and at least one memory module 174 communicatively coupled to the processor 172. The separator system 170 may also include a pump 176 disposed upstream of the hydrocyclone inlet 132. The pump 176 may be operable to convey the multi-phase composition 102 to the hydrocyclone inlet 132, increase or decrease a flowrate or pressure of the multi-phase composition 102 at the hydrocyclone inlet 132, or both. In one or more embodiments, the processor 172 may be communicatively coupled to the pump 176 or a pump control device coupled to the pump 176 to enable control of the pump speed or pumping rate of the pump 176.

The at least one pressure sensor may be operatively coupled to the hydrocyclone inlet 132, the reject outlet 134, the membrane inlets 152 of the ceramic membranes 150, the retentate outlets 154 of the ceramic membranes 150, or the separator casing 110. When used with respect to pressure sensors, the term "operatively coupled" may refer to the pressure sensor being positioned relative to a component or structure of the separator 100 and configured to measure a pressure of a fluid proximate the component or structure. In one or more embodiments, the separator system 170 may include a plurality of pressure sensors, such as a hydrocyclone inlet pressure sensor 180, a lesser-density fluid pressure sensor 182, an intermediate fluid pressure sensor 184, a retentate pressure sensor 186, a permeate pressure sensor 188, or combinations of these pressure sensors.

The separator system 170 can include the hydrocyclone inlet pressure sensor 180 that may be operatively coupled to the hydrocyclone inlet 132. In one or more embodiments, the hydrocyclone inlet pressure sensor 180 may be operatively coupled to the cylindrical inlet chamber 144 of the hydrocyclone 130 or to a transfer line upstream of the hydrocyclone inlet 132. The hydrocyclone inlet pressure sensor 180 may be operable to determine the pressure of the multi-phase composition 102 at the hydrocyclone inlet 132 or in the cylindrical inlet chamber 144, such as by measuring a property or force indicative of the pressure. The hydrocyclone inlet pressure sensor 180 may be operable to transmit a signal indicative of the pressure of the multi-phase composition 102 at the hydrocyclone inlet 132 or cylindrical inlet chamber 144 to the processor 172.

The separator system 170 may include the lesser-density fluid pressure sensor 182 operatively coupled to the reject outlet 134 of the hydrocyclone 130. In one or more embodiments, the lesser-density fluid pressure sensor 182 may be operatively coupled to a transfer line that is downstream of and in fluid communication with the reject outlet 134 of the hydrocyclone 130. The lesser-density fluid pressure sensor 182 may be operable to determine a pressure of the lesser-density fluid 104 passed out of the hydrocyclone 130 from the reject outlet 134, such as by measuring a property or force indicative of the pressure. The lesser-density fluid pressure sensor 182 may be operable to transmit a signal indicative of the pressure of the lesser-density fluid 104 at the reject outlet 134 of the hydrocyclone 130 to the processor 172.

The separator system 170 may include the intermediate fluid pressure sensor 184, which may be operable to measure a pressure of the intermediate fluid 140 passed from the accepted outlet 136 of the hydrocyclone 130 to the membrane inlets 152 of the ceramic membranes 150. The intermediate fluid pressure sensor 184 may be operatively coupled to one or more of the first compartment 118, the accepted outlet 136 of the hydrocyclone 130, the membrane inlet 152 of at least one of the ceramic membranes 150, or combinations of these. In one or more embodiments, the intermediate fluid pressure sensor 184 may be operable to determine the pressure of the intermediate fluid 140 in the first compartment 118 such as by measuring a property or force indicative of the pressure. The intermediate fluid pressure sensor 184 may be operable to transmit a signal indicative of the pressure of the intermediate fluid 140 to the processor 172.

The separator system 170 may include the retentate pressure sensor 186, which may be operable to measure a pressure of the greater-density fluid 106 passed out of the greater-density fluid outlet 124 of the separator 100. The retentate pressure sensor 186 may be operatively coupled to one or more of the third compartment 122 of the separator casing 110, the greater-density fluid outlet 124, the retentate outlet 154 of at least one of the ceramic membranes 150, a transfer pipe or conduit downstream of the greater-density fluid outlet 124, or combinations of these. In one or more embodiments, the retentate pressure sensor 186 may be operable to determine the pressure of the greater-density fluid 106 in the greater-density fluid outlet 124 of the separator casing 110, such as by measuring a property or force indicative of the pressure. The retentate pressure sensor 186 may be operable to transmit a signal indicative of the pressure of the greater-density fluid 106 proximate the greater-density fluid outlet 124 to the processor 172.

The separator system 170 may include the permeate pressure sensor 188, which may be operable to measure a pressure of the medium-density fluid 108 in the second compartment 120 of the separator casing 110 or passed out of the permeate outlet 114 of the separator casing 110. As previously discussed, during operation of separator 100, the medium-density fluid 108 may completely fill the second compartment 120 of the separator casing 110. The permeate pressure sensor 188 may be operatively coupled to one or more of the second compartment 120 of the separator casing 110, the permeate outlet 114, a transfer line downstream of the permeate outlet 114, or combinations of these. In one or more embodiments, the permeate pressure sensor 188 may be operable to determine the pressure of the medium-density fluid 108 in the second compartment 120 of the separator casing 110, the permeate outlet 114, or both, such as by measuring a property or force indicative of the pressure. The permeate pressure sensor 188 may be operable to transmit a signal indicative of the pressure of the medium-density fluid 108 in the second compartment 120, proximate the permeate outlet 114, or both, to the processor 172.

Each of the hydrocyclone inlet pressure sensor 180, the lesser-density fluid pressure sensor 182, the intermediate fluid pressure sensor 184, the retentate pressure sensor 186, and the permeate pressure sensor 188 may be any commercially-available pressure sensor. The pressure sensor for one or more of the hydrocyclone inlet pressure sensor 180, the lesser-density fluid pressure sensor 182, the intermediate fluid pressure sensor 184, the retentate pressure sensor 186, and the permeate pressure sensor 188 may be the same or different. Each of the hydrocyclone inlet pressure sensor 180, the lesser-density fluid pressure sensor 182, the intermediate fluid pressure sensor 184, the retentate pressure sensor 186, the permeate pressure sensor 188, or combinations of these may be communicatively coupled to the processor 172.

Referring to FIG. 3, the separator system 170 may further include at least one control valve operatively coupled to a permeate outlet 114 of the separator casing 110, a greater-density fluid outlet 124 of the separator casing 110, the reject outlet 134 of the hydrocyclone 130, or combinations of these. When used with respect to control valves, the term "operatively coupled" may refer to positioning of the control valve in the flow path of a fluid, such as a transfer pipe or conduit through which the fluid flows, so that the control valve can operate to control the flowrate of the fluid through the flow path. In one or more embodiments, the separator system 170 may include a plurality of control valves, such as but not limited to a retentate control valve 190, a permeate control valve 192, a lesser-density fluid control valve 194, or combinations of these. The retentate control valve 190, permeate control valve 192, lesser-density fluid control valve 194, or combinations of these, may be communicatively coupled to the processor 172.

The retentate control valve 190 may be disposed proximate the greater-density fluid outlet 124 of the separator 100. The retentate control valve 190 may be fluidly coupled to the greater-density fluid outlet 124 or disposed in a transfer line or conduit downstream of the greater-density fluid outlet 124. The retentate control valve 190 may be operable to receive a signal from the processor 172 indicative of a position of the retentate control valve 190. In response to the signal received from the processor 172, the retentate control valve 190 may further be operable to increase or decrease a flowrate of the greater-density fluid 106 passing out of the greater-density fluid outlet 124 of the separator 100.

The permeate control valve 192 may be disposed proximate the permeate outlet 114 of the separator 100. The permeate control valve 192 may be fluidly coupled to the permeate outlet 114 or disposed in a transfer line or conduit downstream of the permeate outlet 114. The permeate control valve 192 may be operable to receive a signal from the processor 172 indicative of a position of the permeate control valve 192. In response to the signal received from the processor 172, the permeate control valve 192 may be further operable to increase or decrease a flowrate of the medium-density fluid 108 passing out of the permeate outlet 114.

The lesser-density fluid control valve 194 may be disposed proximate the reject outlet 134 of the hydrocyclone 130. The lesser-density fluid control valve 194 may be fluidly coupled to the reject outlet 134 of the hydrocyclone 130 or disposed in a transfer line or conduit downstream of the reject outlet 134. The lesser-density fluid control valve 194 may be operable to receive a signal from the processor 172 indicative of a position of the lesser-density fluid control valve 194. In response to the signal received from the processor 172, the lesser-density fluid control valve 194 may be further operable to increase or decrease a flowrate of the lesser-density fluid 104 passing out of the reject outlet 134 of the hydrocyclone 130. Each of the retentate control valve 190, the permeate control valve 192, and the lesser-density fluid control valve 194 may be any type of commercially-available control valve capable of controlling the flow of a fluid through a conduit or pipe. Increasing or decreasing the flowrate of the lesser-density fluid 104, the greater-density fluid 106, the medium-density fluid 108, or combinations of these may change the pressures at various regions within the separator 100.

Referring again to FIG. 3, the at least one processor 172 and at least one memory module 174 may be part of a computing device 171, through which embodiments of the present disclosure can be implemented, such as pressure differential control or flowrate control of the separator 100. The computing device 171 may additionally include a network interface 173 that may be operable to communicatively couple the processor 172 to one or more of the memory modules 174, pressure sensors (hydrocyclone inlet pressure sensor 180, lesser-density fluid pressure sensor 182, intermediate fluid pressure sensor 184, retentate pressure sensor 186, permeate pressure sensor 188), control valves (retentate control valve 190, the permeate control valve 192, the lesser-density fluid control valve 194), flowrate sensor 196 (FIG. 4), or combinations of these. As used in the present disclosure, the term "communicatively coupled" may refer to two components being arranged, coupled, or configured in a manner that enables the two components to send and receive communication signals between the two components and may include wired or wireless communication. The at least one memory module 174 may include machine-readable instructions stored on the memory module 174 that, when executed by the processor 172, cause the separator system 170 to perform one or more actions.

Referring again to FIG. 3, the separator system 170 may be operable to control operation of the separator 100 based on differential pressures in the hydrocyclone 130, the ceramic membranes 150, or both. The hydrocyclone 130 in the separator 100 of the present disclosure may be a static hydrocyclone, meaning that the hydrocyclone is stationary and is not rotated to generate the cyclonic flow. The separation performance of a static hydrocyclone, such as hydrocyclone 130, may be influenced by a reject ratio, a pressure drop ratio, or both. The reject ratio may be defined as a ratio of the flowrate of the fluid through the reject outlet (reject outlet 134 of the hydrocyclone 130) divided by the inlet flowrate to the hydrocyclone (flowrate of the multi-phase composition 102 introduced to the hydrocyclone inlet 132 of hydrocyclone 130). The reject ratio may be expressed as a percentage (percent (%)). For the hydrocyclone 130 of the present disclosure, the reject ratio can be defined as the flowrate of the lesser-density fluid 104 through the reject outlet 134 of the hydrocyclone 130 divided by the flowrate of the multi-phase composition 102 at the hydrocyclone inlet 132 times 100. An expression for the reject ratio for the hydrocyclone 130 of the present disclosure is provided in Equation 1 (EQU. 1):

$$R_R = \frac{Q_{104}}{Q_{102}} \times 100\% \qquad \text{EQU. 1}$$

In EQU. 1, $R_R$ is the reject ratio, $Q_{102}$ is the flowrate of the multi-phase composition 102 at the hydrocyclone inlet 132, and $Q_{104}$ is the flowrate of the lesser-density fluid 104 at the reject outlet 134 of the hydrocyclone 130.

The reject ratio $R_R$ for the hydrocyclone 130 of the present disclosure may be sufficient to separate a majority of the oil droplets and organic compounds in the multi-phase composition 102 into the lesser-density fluid 104. The reject ratio $R_R$ for the hydrocyclone 130 may be greater than or equal to 1.0%, greater than or equal to 1.25%, or even greater than or equal to 1.5%. The reject ratio $R_R$ for the hydrocyclone 130 may be less than or equal to 10.0%, less than or equal to 5.0%, less than or equal to 3.0%, or even less than or equal to 2.5%. The reject ratio $R_R$ for the hydrocyclone 130 may be from 1.0% to 10.0%, from 1.0% to 5.0%, from 1.0% to 3.0%, from 1.0% to 2.0%, from 1.25% to 10.0%, from 1.25% to 5.0%, from 1.25% to 3.0%, from 1.25% to 2%, from 1.5% to 10.0%, from 1.5% to 5.0%, or from 1.5% to 3.0%. In one or more embodiments, the reject ratio $R_R$ for the hydrocyclone 130 may be from 1.0% to 3.0%, from 1.75% to 2.25%, from 1.9% to 2.1%, or even about 2.0%.

The pressure drop ratio of a hydrocyclone may be defined as a ratio of the pressure drop between the inlet of the hydrocyclone and the reject outlet and the pressure drop between the inlet of the hydrocyclone and the aqueous outlet. In the hydrocyclone 130 of the present disclosure, the pressure drop ratio may be a ratio of the pressure drop between the hydrocyclone inlet 132 and the reject outlet 134 and the pressure drop between the hydrocyclone inlet 132 and the accepted outlet 136 (aqueous outlet). An expression for the pressure drop ratio for the hydrocyclone 130 of the present disclosure is provided in Equation 2 (EQU. 2).

$$C = \frac{dP_{104}}{dP_{140}} = \frac{P_{IN} - P_L}{P_{IN} - P_{OUT}} \qquad \text{EQU. 2}$$

In EQU. 2, C is the pressure drop ratio, $dP_{104}$ is the differential pressure for the lesser-density fluid 104 (pressure drop between the hydrocyclone inlet 132 and the reject outlet 134); and $dP_{140}$ is the pressure differential for the intermediate fluid 140 (pressure drop between the hydrocyclone inlet 132 and the accepted outlet 136). $P_{IN}$ is the pressure at the hydrocyclone inlet 132 as determined by the hydrocyclone inlet pressure sensor 180. $P_L$ is the pressure at the reject outlet 134 as determined by the lesser-density fluid pressure sensor 182. $P_{OUT}$ is the pressure of the intermediate fluid 140 at the accepted outlet 136 as determined by the intermediate fluid pressure sensor 184.

The pressure drop ratio C and the reject ratio $R_R$ may be interdependent. For example, changing the pressure drop ratio C may change the pressure $P_L$ of the lesser-density fluid 104 passing out of the reject outlet 134 of the hydrocyclone 130, which may change the flowrate Qum of the lesser-density fluid 104 out of the hydrocyclone 130. Per EQU. 1, changing the flowrate $Q_{104}$ of the lesser-density fluid 104 may result in a change in the reject ratio $R_R$.

The pressure drop ratio C for the hydrocyclone 130 of the present disclosure may be sufficient to separate a majority of the oil droplets and organic compounds from the multiphase composition 102 to produce the lesser-density fluid 104. The pressure drop ratio C for the hydrocyclone 130 may be greater than or equal to 1.4, greater than or equal to 1.5, or even greater than or equal to 1.6. The pressure drop ratio C for the hydrocyclone 130 may be less than or equal to 2.0, less than or equal to 1.9, or even less than or equal to 1.8. The pressure drop ratio C for the hydrocyclone 130 may be from 1.4 to 2.0, from 1.4 to 1.9, from 1.4 to 1.8, from 1.5 to 2.0, from 1.5 to 1.9, from 1.5 to 1.8, from 1.6 to 2.0, from 1.6 to 1.9, or from 1.6 to 1.8.

Referring again to FIG. 3, the separator system 170 may also be operable to control operation of the ceramic membranes 150 to separate the intermediate fluid 140 into the greater-density fluid 106 and the medium-density fluid 108 by controlling the pressure drop across the ceramic membranes 150. The pressure drop across the ceramic membranes 150 may refer to the difference between the pressure at the retentate side 156 and the pressure on the permeate side 158 of the ceramic membranes 150. For example, increasing the difference between the pressure at the permeate side 158 and the retentate side 156 of the ceramic membranes 150 may increase the mass flux of the medium-density fluid 108 through the ceramic membranes 150. In addition to influencing the mass flux of the medium-density fluid 108 through the ceramic membranes 150, the pressure drop across the ceramic membranes 150 may have an effect on the hydrodynamic balance of the hydrocyclone 130, such as by affecting the pressure drop ratio C.

Referring again to FIG. 3, the separator system 170 may be pressure drop ratio controlled. In other words, control of the separator 100 by the separator system 170 may be based on maintaining a target pressure drop ratio C across the hydrocyclone 130. To accomplish control of the separator 100 based on the pressure drop ratio C, the separator system 170 may be operable to measure the pressure of one or more of the multi-phase composition 102 at the hydrocyclone inlet 132, the lesser-density fluid 104 at the reject outlet 134 of the hydrocyclone 130, the intermediate fluid 140 at the accepted outlet 136 of the hydrocyclone 130, the greater-density fluid 106 at the greater-density fluid outlet 124 of the separator 100, the medium-density fluid 108 in the separator casing 110 or at the permeate outlet 114, or combinations of these, using one or more of the pressure sensors 180, 182, 184, 186, 188 previously described in the present disclosure. The separator system 170 may be operable to adjust the pressure of the lesser-density fluid 104, the greater-density fluid 106, the medium-density fluid 108, the intermediate fluid 140, or combinations of these, using one or more of the control valves 190, 192, 194 previously described in the present disclosure.

Referring again to FIG. 3, for pressure drop control of the separator 100, the pressure drop ratio C of the hydrocyclone 130 may be determined by determining the pressure $P_{IN}$ of the multi-phase composition 102 at the hydrocyclone inlet 132 using the hydrocyclone inlet pressure sensor 180; the pressure $P_L$ of the lesser-density fluid 104 at the reject outlet 134 using the lesser-density fluid pressure sensor 182; and the pressure $P_{OUT}$ of the intermediate fluid 140 at the accepted outlet 136 using the intermediate fluid pressure sensor 184. The pressure drop ratio C may then be calculated from EQU. 2. The pressure drop ratio C may be increased or decreased by manipulating the retentate control valve 190, the lesser-density fluid control valve 194, or both. For example, moving the retentate control valve 190 at the greater-density outlet 124 of the separator 100 to a more open or a more closed position may decrease or increase, respectively, the pressure of the greater-density fluid 106 at the greater-density fluid outlet 124, which may cause the pressure $P_{OUT}$ of the intermediate fluid 140 at the accepted outlet 136 of the hydrocyclone 130 to decrease or increase, respectively. Moving the lesser-density fluid control valve 194 at the reject outlet 134 of the separator 100 to a more open or a more closed position may decrease or increase, respectively, the pressure $P_L$ of the lesser-density fluid 104 at the reject outlet 134. The pressure $P_{IN}$ of the multi-phase composition 102 at the hydrocyclone inlet 132 may be controlled by a pressure controller or in some instances by increasing or decreasing a pumping rate of the pump 176.

The pressure drop across the ceramic membranes 150 may be determined by measuring the pressure $P_{OUT}$ of the intermediate fluid 140 at the membrane inlets 152, the pressure $P_H$ of the greater-density fluid 106 at the greater-density fluid outlet 124, and the pressure $P_F$ of the medium-density fluid 108 at the permeate outlet 114 or in the separator casing 110 (in the second compartment 120 of the separator casing 110). The flowrate of the medium-density fluid 108 (permeate) through the ceramic membrane 150 from the retentate side 156 to the permeate side 158 may be increased or decreased by manipulating the retentate control valve 190, the permeate control valve 192, or both. For example, moving the permeate control valve 192 to a more open or a more closed position may decrease or increase, respectively, the pressure $P_F$ of the medium-density fluid 108 at the permeate side 158 of the ceramic membranes 150, which may increase or decrease, respectively, the flowrate of the medium-density fluid 108 through the ceramic membranes 150.

Referring to FIG. 3, the processor 172 of the separator system 170 may be communicatively coupled to at least one of the pressure sensors 180, 182, 184, 186, 188 and at least one control valve 190, 192, 194. Communication may be provided by the at least one network interface 173. The processor 172 may be communicatively coupled to the hydrocyclone inlet pressure sensor 180, the lesser-density fluid pressure sensor 182, the intermediate fluid pressure sensor 184, the retentate pressure sensor 186, the permeate pressure sensor 188, or combinations of these. The processor 172 may also be communicatively coupled to the retentate control valve 190, the permeate control valve 192, the lesser-density fluid control valve 194, or combinations of these.

The at least one memory module 174 may be communicatively coupled to the at least one processor 172. The separator system 170 may further include machine readable instructions stored on the at least one memory module 174. The machine readable instructions, when executed by the at least one processor 172, may cause the separator system 170 to measure a pressure of at least one of the multi-phase composition 102 introduced to the hydrocyclone inlet 132 of the hydrocyclone 130, the lesser-density fluid 104 at the reject outlet 134, the intermediate fluid 140 passed from the accepted outlet 136 of the hydrocyclone 130 to the membrane inlets 152, the medium-density fluid 108 in the separator casing 110, the greater-density fluid 106 at the greater-density fluid outlet 124 of the separator casing 110, or combinations of these. The machine readable instructions, when executed by the at least one processor 172, may cause the separator system 170 to control the at least one control valve, such as one or more of the retentate control valve 190, the permeate control valve 192, the lesser-density fluid control valve 194, or combinations of these control valves, based on the measured pressure. In one or more embodiments, the machine readable instructions, when executed by the at least one processor 172, may further cause the separator system 170 to compare the measured pressure against a target pressure for the multi-phase composition 102 introduced to the hydrocyclone 130, the lesser-density fluid 104 at the reject outlet 134, the intermediate fluid 140 passed from the accepted outlet 136 of the hydrocyclone 130 to the membrane inlets 152, the medium-density fluid 108 in the separator casing 110, or the greater-density fluid 106 at the greater-density fluid outlet 124 of the separator casing 110, respectively. The machine readable instructions, when executed by the processor 172, may cause the separator system 170 to control the at least one control valve, such as the retentate control valve 190, the permeate control valve 192, the lesser-density fluid control valve 194, or combinations of these, based on the comparison.

Figure 4:
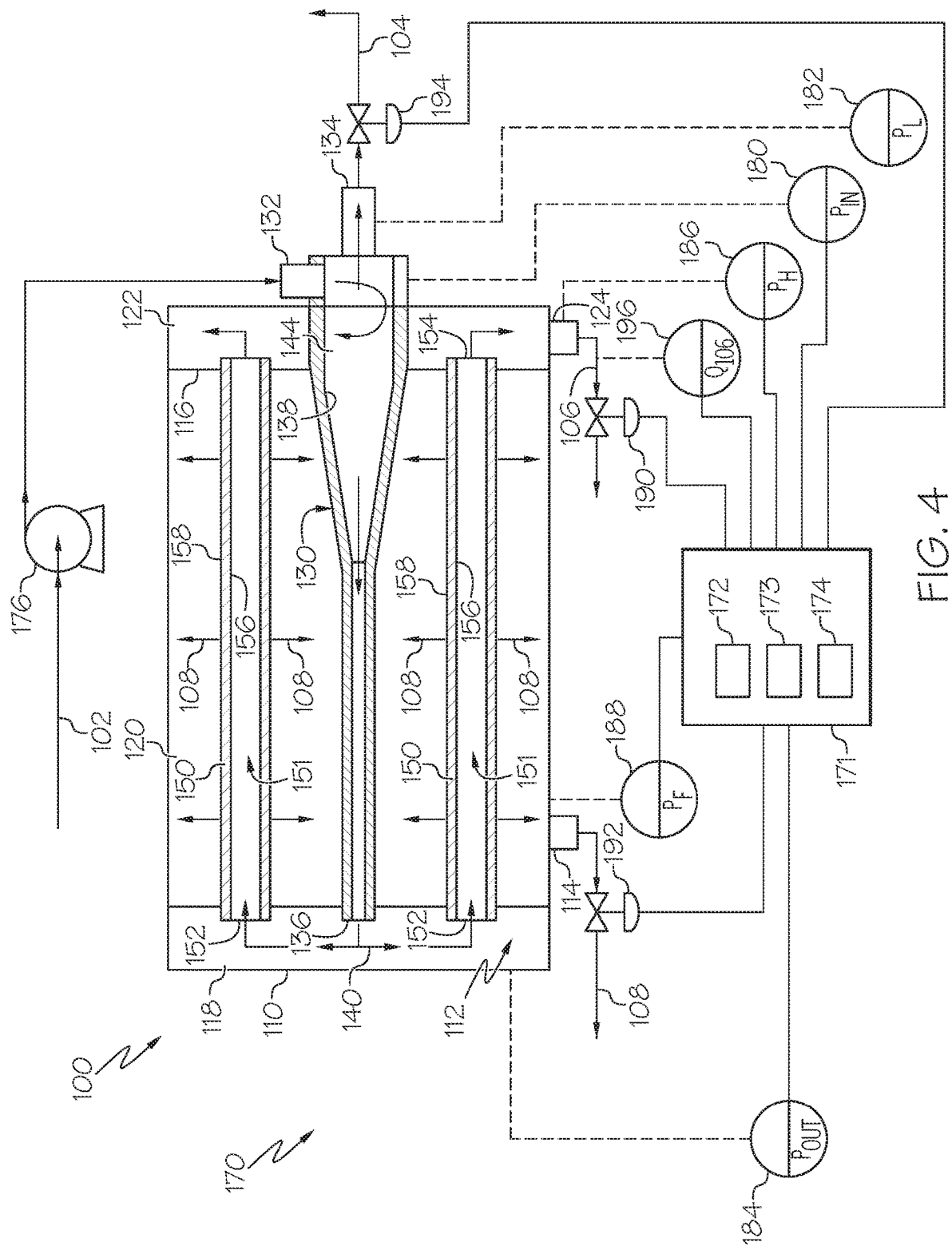
FIG. 4 schematically depicts another embodiment of a separator system comprising the separator of FIG. 1, according to one or more embodiments shown and described in the present disclosure.

Referring now to FIG. 4, the separator system 170 may include a flowrate sensor 196. The flowrate sensor 196 may be disposed in the greater-density fluid outlet 124 of the separator casing 110. In one or more embodiments, the flowrate sensor 196 may be disposed upstream of the retentate control valve 190. The flowrate sensor 196 may be operable to determine a flowrate $Q_{106}$ of the greater-density fluid 106 passing out of the greater-density fluid outlet 124 of the separator 100. The flowrate sensor 196 may be any type of commercially available device operable to determine the flowrate of a fluid, such as the flowrate of a fluid through a pipe or conduit.

Referring again to FIG. 4, in one or more embodiments, the separator system 170 may be flowrate controlled, meaning that the separator system 170 may be operable to control operation of the separator 100 based on the flowrate of one or more of the lesser-density fluid 104, the greater-density fluid 106, the medium-density fluid 108, the multi-phase composition 102 introduced to the separator 100, or combinations of these. The separator system 170 may use the flowrate of one or more fluid streams in combination with one or more of the pressure $P_L$ of the lesser-density fluid 104, the pressure $P_{IN}$ of the multi-phase composition 102 introduced to the hydrocyclone inlet 132, the pressure $P_{OUT}$ of the intermediate fluid 140, the pressure $P_F$ of the medium-density fluid 108, or the pressure $P_H$ of the greater-density fluid 106 to control operation of the separator 100. In one or more embodiments, the separator system 170 may be operable to measure the flowrate $Q_{106}$ of the greater-density fluid 106 passing out of the greater-density fluid outlet 124 of the separator 100. The separator system 170 may be operable to maintain the flowrate $Q_{106}$ of the greater-density fluid 106 passing out of the separator 100 at a target flowrate of the greater-density fluid 106 by adjusting the position of the retentate control valve 190. The separator system 170 may adjust the permeate control valve 192, the lesser-density fluid control valve 194, or both, to adjust the pressures of the various fluid streams of the separator 100 in response to changes in the flowrate $Q_{106}$ of the greater-density fluid 106.

The separator system 170 may include machine readable instructions stored on the at least one memory module 174 that, when executed by the processor 172, may cause the separator system 170 to measure the flowrate $Q_{106}$ of the greater-density fluid 106 passing out of the greater-density fluid outlet 124 of the separator casing 110 and control the at least one control valve (retentate control valve 190, permeate control valve 192, or lesser-density fluid control valve 194) based on the measured flowrate $Q_{106}$ of the greater-density fluid 106. In one or more embodiments, the at least one control valve may be the retentate control valve 190. The machine readable instructions, when executed by the processor, may further compare the measured flowrate $Q_{106}$ of the greater-density fluid 106 with the target flowrate of the greater-density fluid 106 and adjust the retentate control valve 190 based on the comparison.

Although the separator system 170 is depicted in FIGS. 3 and 4 as including the processor 172 communicatively coupled to various pressure sensors, flowrate sensors, and control valves, it is understood that the methods of pressure drop ratio control or flowrate control of the separator 100 may be accomplished using any digital or analog techniques or devices. It is intended for the methods of the present disclosure to include implementation of method steps using either digital or analog technologies.

Referring again to FIG. 4, operation of the separator 100 may be controlled by the separator system 170 through a combination of pressure drop control and flowrate control. For example, the separator system 170 may control operation of the separator 100 by determining the flowrate $Q_{106}$ of the greater-density fluid 106 in combination with the pressure drop ratio C of the hydroclyclone 130, the pressure differential across the ceramic membranes 150, or both. The determined values for the flowrate $Q_{106}$ of the greater-density fluid 106, the pressure drop ratio C of the hydrocyclones 130, the pressure differential across the ceramic membranes 150, or combinations of these can be used by the processor 172 of the computing device 171 to adjust one or more of the pressures in the separator 100 to control operation of the separator 100.

Referring again to FIG. 3, a method of separating the multi-phase composition 102 having an aqueous phase, an oleaginous phase, and a solid phase may include passing the multi-phase composition 102 to the separator 100, which may have any of the features or characteristics previously described in this disclosure for separator 100. The separator 100 may be operable to separate the multi-phase composition 102 into the lesser-density fluid 104, the medium-density fluid 108, and the greater-density fluid 106. The method may further include collecting the lesser-density fluid 104 from the reject outlet 134 of the hydrocyclone 130, collecting the greater-density fluid 106 from the greater-density fluid outlet 124 of the separator casing 110, and collecting the medium-density fluid 108 from the permeate outlet 114 of the separator casing 110.

The method may further include measuring a pressure of at least one of the following: the multi-phase composition 102 at the hydrocyclone inlets 132 (pressure $P_{IN}$); the lesser-density fluid 104 at the accepted outlet 132 of the hydrocyclones 130 (pressure $P_L$); the intermediate fluid 140 passed from the accepted outlet 136 of the hydrocyclones 130 to the membrane inlets 152 (pressure $P_{OUT}$); the medium-density fluid 108 in the separator casing 110 or at the permeate outlet 114 (pressure $P_F$); the greater-density fluid 106 at the greater-density fluid outlet 124 of the separator casing 110 (pressure $P_H$); or combinations of these. The method may further include adjusting a position of the retentate control valve 190 at the greater-density fluid outlet 124, the permeate control valve 192 at the permeate outlet 114, the lesser-density fluid control valve 194 at the reject outlet 134 of the hydrocyclones 130, or combinations of these, based on the measured pressure. As previously discussed, adjusting the position of one or more of the retentate control valve 190, the permeate control valve 192, or the lesser-density fluid control valve 194 may increase or decrease the pressure of one or more of the multi-phase composition 102, the lesser-density fluid 104, the intermediate fluid 140, the greater-density fluid 106, the medium-density fluid 108, or combinations of these. The method may further include comparing the measured pressure against a target pressure and adjusting the position of the retentate control valve 190 at the greater-density fluid outlet 124, the permeate control valve 192 at the permeate outlet 114, the lesser-density fluid control valve 194 at the reject outlets 134 of the hydrocyclones 130, or combinations of these, based on the comparison.

The method may include measuring the flowrate $Q_{106}$ of the greater-density fluid 106 passing out of the greater-density fluid outlet 124 of the separator casing 110 and increasing or decreasing the flowrate $Q_{106}$ of the greater-density fluid 106 from the greater-density fluid outlet 124 based on the measured pressure. The method may further include adjusting the position of the permeate control valve 192 at the permeate outlet 114, a lesser-density fluid control valve 194 at the reject outlet 134 of the hydrocyclone 130, or both, in response to increasing or decreasing the flowrate $Q_{106}$ of the greater-density fluid 106 from the greater-density fluid outlet 124. Adjusting the position of the permeate control valve 192 or the lesser-density fluid control valve 194 may increase or decrease the pressures of one or more of the multi-phase composition 102, the lesser-density fluid 104, the intermediate fluid 140, the greater density fluid 106, the medium-density fluid 108, or combinations of these.

Referring now to FIG. 5, another embodiment of the separators of the present disclosure is depicted, and will be referred to in the present disclosure with reference number 200. Separator 200 may include a separator housing 210 and one or a plurality of hydrocyclones 230 disposed within the separator casing 210. The separator casing 210 may define a chamber 212 and may include a permeate outlet 214. The hydrocyclone 230 or plurality of hydrocyclones 230 may be disposed within the chamber 212 defined by the separator casing 210. The hydrocyclones 230 may include a ceramic membrane 250 disposed in at least a portion of a tapered section 238 of the hydrocyclones 230.

As previously discussed in relation to hydrocyclone 130, the hydrocyclone 230 of separator 200 may be a mechanical device operable to separate lesser-density constituents of the multi-phase composition 102, such as but not limited to oil droplets and organic compounds, from the greater-density constituents of the multi-phase composition 102, such as solids, water, or water soluble constituents. The multi-phase composition 102 may have any of the features, constituents, or characteristics previously described in the present disclosure.

The hydrocyclone 230 may operate by producing a cyclonic flow that creates centrifugal forces, which may cause the greater-density constituents of the multi-phase composition 102 to move radially outward from a center axis A of the hydrocyclone 230 towards the walls 242 of the hydrocyclone 230. The hydrocyclone 230 may include a hydrocyclone inlet 232, a cylindrical inlet chamber 244, the tapered section 238 downstream of the cylindrical inlet chamber 244, a reject outlet 234, and an accepted outlet 236. The tapered section 238 may be disposed between the reject outlet 234 and the accepted outlet 236. The tapered section 238 may be frusto-conical in shape having a wide end and a narrow end, where the wide end has a greater diameter than the narrow end. The wide end may be disposed at an upstream end of the tapered section 238, and the narrow end may be disposed downstream of the wide end of the tapered section 238. The wide end of the tapered section 238 may be coupled to the cylindrical inlet chamber 244. The tapered section 238 may be defined by a cone angle α and a length LT of the tapered section 238. The cone angle α, length LT of the tapered section 238, and overall length L of the hydrocyclone 230 may be selected based on the characteristics of the multi-phase composition 102. The tapered section 238 may be centered about the center axis A of the hydrocyclone 230.

The reject ratio $R_R$ for the hydrocyclone 230 of the separator 200 may be sufficient to separate a majority of the oil droplets and organic compounds in the multi-phase composition 102 into the lesser-density fluid 104. The reject ratio $R_R$ for the hydrocyclone 230 may be greater than or equal to 1.0%, greater than or equal to 1.25%, or even greater than or equal to 1.5%. The reject ratio $R_R$ for the hydrocyclone 230 may be less than or equal to 5.0%, less than or equal to 3.0%, or even less than or equal to 2.5%. For reject ration $R_R$ greater than 5.0%, the flowrate across the ceramic membrane 250 of the tapered section may be reduced, which may decrease the effectiveness of the ceramic membrane 250 for separating the solids. The reject ratio $R_R$ for the hydrocyclone 130 may be from 1.0% to 5.0%, from 1.0% to 3.0%, from 1.0% to 2.0%, from 1.25% to 5.0%, from 1.25% to 3.0%, from 1.25% to 2%, from 1.5% to 5.0%, or from 1.5% to 3.0%. In one or more embodiments, the reject ratio $R_R$ for the hydrocyclone 230 may be from 1.0% to 3.0%, from 1.75% to 2.25%, from 1.9% to 2.1%, or even about 2.0%.

The hydrocyclone inlet 232 may be coupled to the cylindrical inlet chamber 244 and may be configured to introduce the multi-phase composition 102 to the hydrocyclone 230 in a manner that creates a cyclonic flow in the hydrocyclone 230. The hydrocyclone inlet 232 may be tangent to the inner cylindrical surface of the cylindrical inlet chamber 244. In one or more embodiments, the hydrocyclone inlet 232 may be coupled to the cylindrical inlet chamber 244 so that the hydrocyclone inlet 232 may be parallel with a plane tangent to the cylindrical inlet chamber 244.

The reject outlet 234 of the hydrocyclone 230 may be in fluid communication with the cylindrical inlet chamber 244 of the hydrocyclone 230 and may be aligned with the center axis A of the hydrocyclone 230. The reject outlet 234 may be coupled to the cylindrical inlet chamber 244 at an end opposite the tapered section 238. The reject outlet 234 may include an open-ended conduit that extends at least partially into the cylindrical inlet chamber 244. The open-ended conduit may be operable to reduce or prevent the multi-phase composition 102 introduced to the hydrocyclone 230 from flowing directly into the reject outlet 234 without being subjected to the cyclonic flow within the hydrocyclone 230. The accepted outlet 236 of the hydrocyclone 230 may be positioned downstream of the narrow end of tapered section 238. In other words, accepted outlet 236 of the hydrocyclone 230 may be positioned at a downstream end of the tapered section 238 relative to the upstream end coupled to the cylindrical inlet chamber 244. The accepted outlet 236 may be aligned with the center axis A of the hydrocyclone 230. In some embodiments, the accepted outlet 236 of the hydrocyclone 230 may extend through the separator casing 210 to provide a medium-density fluid outlet 224 of the separator 200. The medium-density fluid outlet 224 may be an outlet from which the medium-density fluid 108 passes out of the separator 200.

The tapered section 238 may include the ceramic membrane 250. The ceramic membrane 250 may form at least a portion of the tapered section 238 of the hydrocyclone 230. The ceramic membrane 250 may extend downstream of the narrow end of the tapered section 238 of the hydrocyclone 230 in the direction of the accepted outlet 236. The ceramic membrane 250 may have a retentate side 256 oriented toward an interior of the hydrocyclone 230, such as inward towards the center axis A, and a permeate side 258 in fluid communication with the chamber 212 defined by the separator casing 210. At least a portion of the retentate side 256 of the ceramic membrane 250 may have a frusto-conical shape. The ceramic membrane 250 may have a frusto-conical portion and a cylindrical portion, where in the frusto-conical portion, the retentate side 256 has a frusto-conical shape and, in the cylindrical portion, the retentate side 256 may have a cylindrical shape. The cylindrical portion may extend downstream of the tapered section 238 of the hydrocyclone 230. The frusto-conical shape of the portion of the retentate side 256 of the ceramic membrane 250 may contribute to maintain the cyclonic fluid flow through the cavity defined by the walls 242 of the ceramic membrane 250. The continued cyclonic or vortex fluid flow in the tapered section 238 having the ceramic membrane 250 may maintain movement of the fluids near the retentate side 256 of the ceramic membrane 250, which may operate to reduce bio-fouling of the ceramic membrane 250. Thus, the vortex flow in the tapered section 258 of the hydrocyclone 230 may reduce or prevent bio-fouling of the retentate side 256 of the ceramic membrane 250 in the tapered section 258.

The retentate side 256 of the ceramic membrane 250 may be flush with the walls 242 of the hydrocyclone 230 at the upstream and downstream ends of the ceramic membrane 250. The frusto-conical shape of the ceramic membrane 250 may enable the hydrocyclone 230 to be operable to produce a cyclonic fluid flow in the multi-phase composition 102 introduced to the hydrocyclone 230. The permeate side 258 of the ceramic membrane 250 may be in fluid communication with the chamber 212 defined by the separator casing 210 and the permeate outlet 214 of the separator casing 210.

Figure 6:
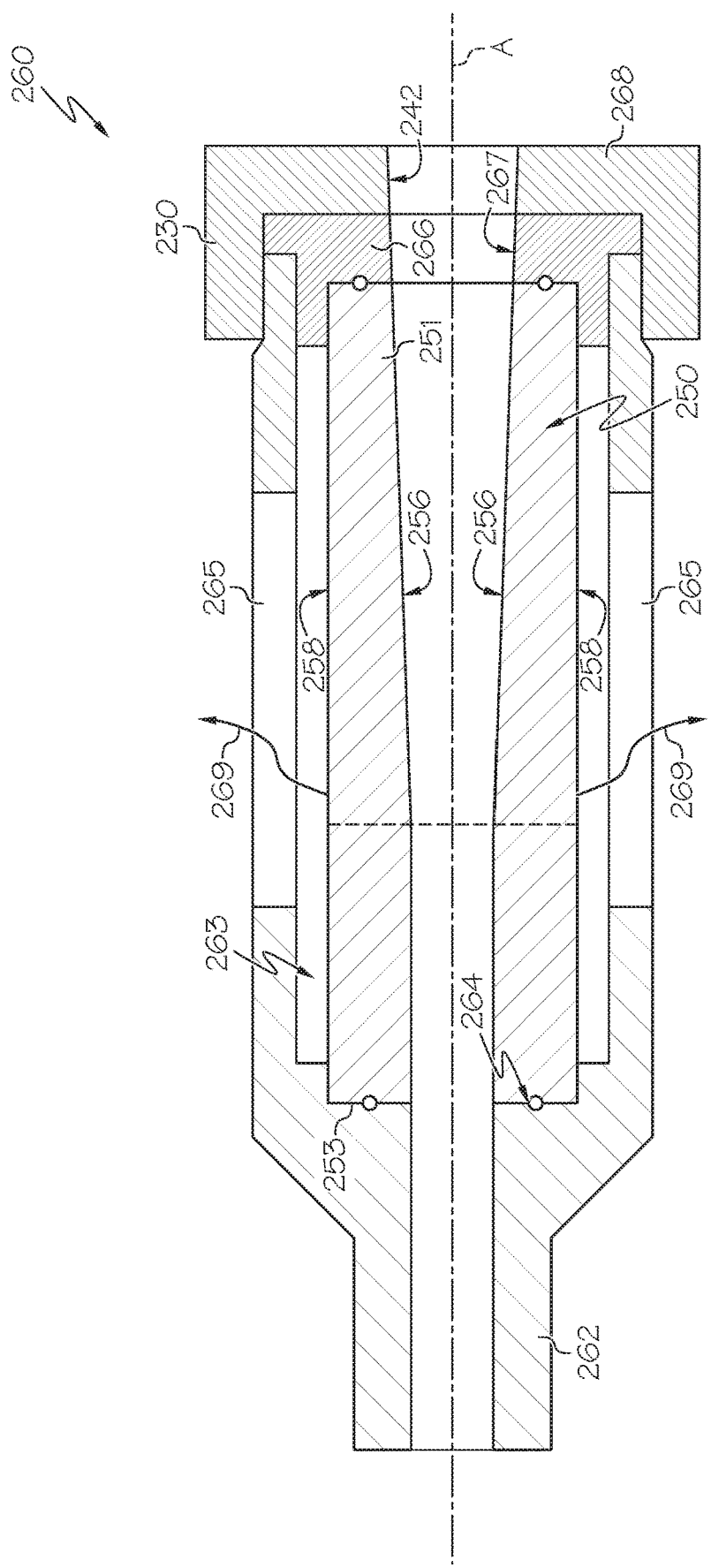
FIG. 6 schematically depicts a ceramic membrane assembly for incorporating a ceramic membrane into a tapered section of a hydrocyclone of the separator of FIG. 5, according to one or more embodiments shown and described in the present disclosure.

Referring to FIG. 6, a portion of the hydrocyclone 230 of separator 200 is depicted showing an embodiment of a ceramic membrane assembly 260 for incorporating the ceramic membrane 250 into the hydrocyclone 230. The ceramic membrane assembly 260 may include a membrane housing 262 defining an internal chamber 263 having a diameter at a downstream end 253 sufficient to center the downstream end 253 of the ceramic membrane 250 and ensure that the downstream end 253 of the ceramic membrane 250 is positioned accurately on the seal arrangement 264. The ceramic membrane 250 may be disposed within the internal chamber 263 of the membrane housing 262 with a downstream end of the ceramic membrane 250 seated against the seal arrangement 264. The membrane housing 262 may include a plurality of openings 265, such as slots, holes, or perforations, that may enable fluid communication between the permeate side 258 of the ceramic membrane and the chamber 212 defined by the separator casing 210. Arrows 269 in FIG. 6 indicate the permeate passing from the permeate side 258 of the ceramic membrane 250 through the openings 265 to the chamber 212 of the separator casing 210.

Referring again to FIG. 6, the ceramic membrane assembly 260 may include a centering flange 266 disposed at the upstream end of the ceramic membrane 250. The centering flange 266 may be operable to position the ceramic membrane 250 within the membrane housing 262 so that the retentate side 256 of the ceramic membrane 250 is flush with the walls 242 of the hydrocyclone 230. The centering flange 266 may include a frusto-conical opening 267 providing a transitional surface between the ceramic membrane 250 and a head 268 of the hydrocyclone 230. The head 268 of the hydrocyclone 230 may be coupled to the membrane housing 262 to secure the ceramic membrane 250 within the membrane housing 262. The ceramic membrane assembly 260 may include seals 264 at either end of the ceramic membrane 250. The seals 264 may be operable to reduce or prevent fluid flow between the retentate side 256 and permeate side 258 of the ceramic membrane 250 without passing through the ceramic membrane 250. FIG. 6 shows one embodiment of a ceramic membrane assembly 260. However, it is understood that methods or mechanical arrangements other than the one shown in FIG. 6 may be employed to secure the ceramic membrane 250 in the hydrocyclone 230.

For separator 200, the ceramic membrane 250 may be a particle filtration membrane having an average pore size sufficient to enable suspended solid particles from the multi-phase composition 102 to pass through the ceramic membrane 250. The ceramic membranes 250 of the separator 200 may have an average pore size of greater than or equal to 0.25 µm, greater than or equal to 0.5 µm, greater than or equal to 0.75 µm, or greater than or equal to 1.0 µm. The ceramic membrane 250 of the separator 200 may have an average pore size of less than or equal to 25 µm, less than or equal to 20 µm, or less than or equal to 15 µm. The ceramic membrane 250 of separator 200 may have an average pore size of from 0.25 µm to 25 µm, from 0.25 µm to 20 µm, from 0.25 µm to 15 µm, from 0.5 µm to 25 µm, from 0.5 µm to 20 µm, from 0.5 µm to 15 µm, from 0.75 µm to 25 µm, from 0.75 µm to 20 µm, 0.75 µm to 15 µm, from 1.0 µm to 25 µm, from 1.0 µm to 20 µm, or from 1.0 µm to 15 µm.

The separator 200 may be operable to separate the multi-phase composition 102 into the lesser-density fluid 104, the greater-density fluid 106, and the medium-density fluid 108. The lesser-density fluid 104 may be passed out of the reject outlet 234 of the hydrocyclone 230, the medium-density fluid 108 may be passed out of the accepted outlet 236 of the hydrocyclone 230, and the greater-density fluid 106 may pass through the ceramic membrane 250 into the chamber 212 defined by the separator casing 210.

Figure 14:
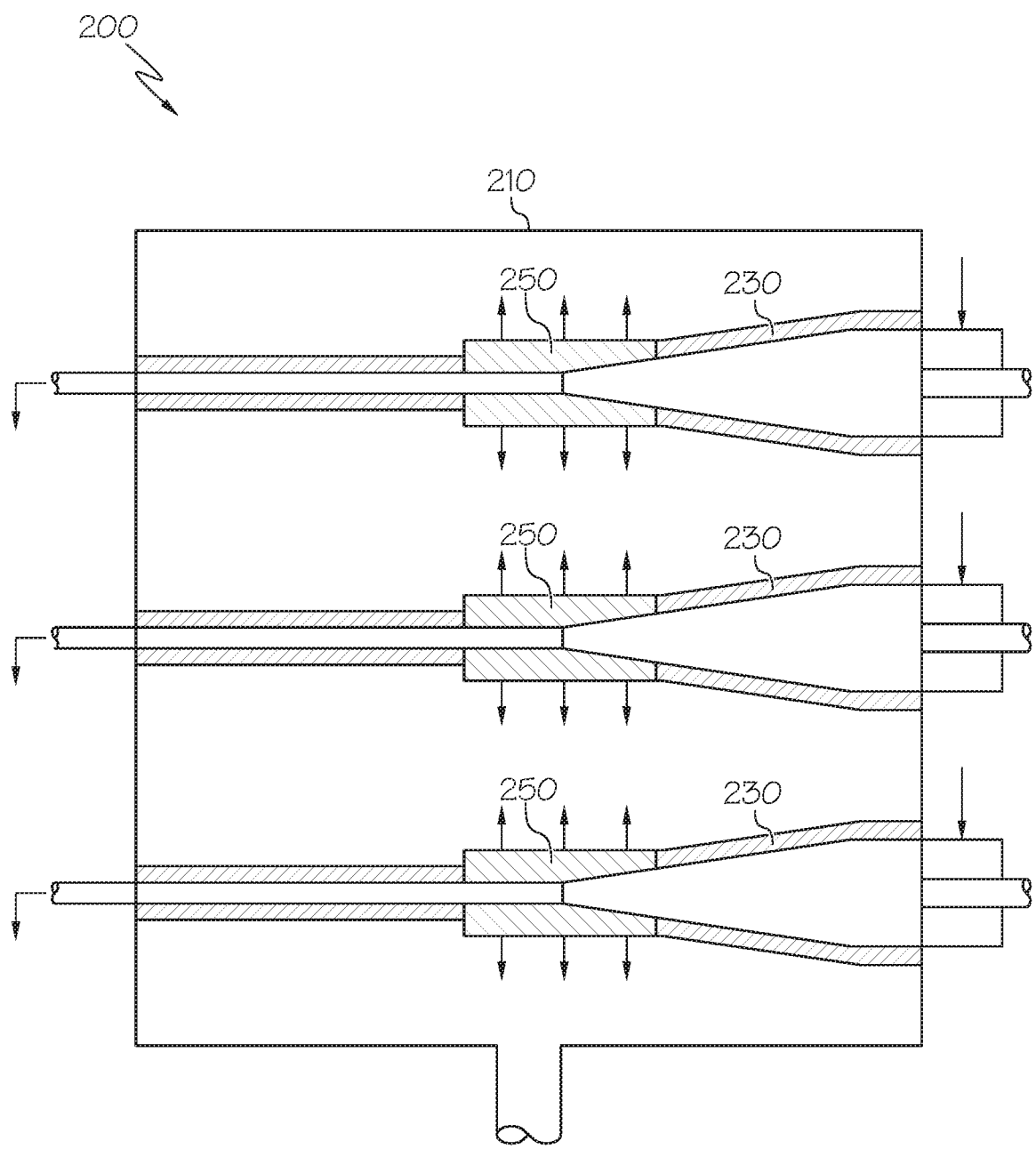
FIG. 14 schematically depicts another separator having a plurality of hydrocylones and a plurality of ceramic membranes, according to one or more embodiments shown and described in the present disclosure.

For ease of illustration and description, the separator 200 is described in the context of having a single hydrocyclone 230. However, it is understood that any of the separators 200 and separator systems 270 of the present disclosure may have a plurality of hydrocyclones 230 disposed within the separator casing 210. Referring now to FIG. 14, the separator 200 may have a plurality of hydrocyclones 230, such as 2, 3, 4, 5, 6, or more than 6 hydrocyclones 230 disposed within the separator casing. Such a layout may enable a number of hydrocyclones 230 to operate in parallel under the same process conditions, thus, increasing the flow capacity of the separator 200 while reducing the spatial footprint and the costs associated with manufacturing and site installation. In one or more embodiments, the separators 200 may include up to several dozen hydrocyclones 230 disposed with the separator casing 210.

Referring again to FIG. 5, in operation of the separator 200, the multi-phase composition 102 may be introduced to the hydrocyclone 230 through the hydrocyclone inlet 232. The hydrocyclone 230 may be operable to produce a cyclonic or vortex flow within the hydrocyclone 230. The centrifugal forces produced in the tapered section 238 of the hydrocyclone 230 may cause the greater-density constituents, such as suspended solid particles and aqueous constituents, of the multi-phase composition 102 to migrate radially outward towards the walls 242 of the hydrocyclone 230. The cyclonic flow may cause the lesser-density constituents, such as oil droplets and other organic components, to migrate toward the center axis A of the hydrocyclone 230. The lesser-density constituents may form a secondary vortex, which may convey the lesser-density constituents towards the reject outlet 234 of the hydrocyclone 230 (in the +X direction of the coordinate axis in FIG. 5). The lesser-density fluid 104 may be passed out of the separator 200 by way of the reject outlet 234 of the hydrocyclone 230. The lesser-density fluid 104 may have a greater concentration of oil droplets, organic compounds, or both, compared to the multi-phase composition 102. The lesser-density fluid 104 may have a decreased concentration of suspended solids and aqueous constituents compared to the multi-phase composition 102.

The cyclonic flow may cause suspended solid particles to concentrate along the walls 242 of the hydrocyclone 230. The ceramic membrane 250 may be disposed in at least a downstream portion of the tapered section 238. The ceramic membrane 250 may have a porosity that enables suspended solids from multi-phase composition 102 to pass through the ceramic membrane 250 into the chamber 212. When the solids concentrated at the wall 242 reach the ceramic membrane 250, the average pore size of the ceramic membrane 250 may allow the solid particles to pass through the ceramic membrane 250 from the retentate side 256 to the permeate side 258 and into the chamber 212. At least a portion of the water and other greater-density constituents may also pass through the ceramic membrane 250. Migration of the solid particles through the ceramic membrane 250 may provide a partial blocking effect, which may reduce the flowrate of water and other greater-density constituents through the ceramic membrane 250. Thus, the permeate passing through the ceramic membrane 250 may be the greater-density fluid 106 having a greater concentration of solid particles compared to the multi-phase composition 102 introduced to the separator 200. The greater-density fluid 106 passing through the ceramic membrane 250 may completely fill the chamber 212 defined by the separator casing 210. The greater-density fluid 106 may be passed out of the chamber 212 and out of the separator 200 through the permeate outlet 214.

The remaining aqueous constituents of the multi-phase composition 102 may continue in cyclonic flow through the hydrocyclone 230 to the accepted outlet 236 of the hydrocyclone 230. The fluid exiting the accepted outlet 236 of the hydrocyclone 230 downstream of the ceramic membrane 250 may be the medium-density fluid 108. The medium-density fluid 108 may have a concentration of solid particles less than the concentration of solid particles in the greater-density fluid 106 passing through the ceramic membrane 250. The medium-density fluid 108 may also have a concentration of oil droplets and other organic compounds less than the concentration of oil droplets and organic compounds in the lesser-density fluid 104. In some embodiments, the accepted outlet 236 of the hydrocyclone 230 may extend through the separator casing 210 such that the accepted outlet 236 comprises the medium-density fluid outlet 224 of the separator 200. The medium-density fluid 108 may be passed out of the separator 200 through the medium-density fluid outlet 224.

Figure 7:
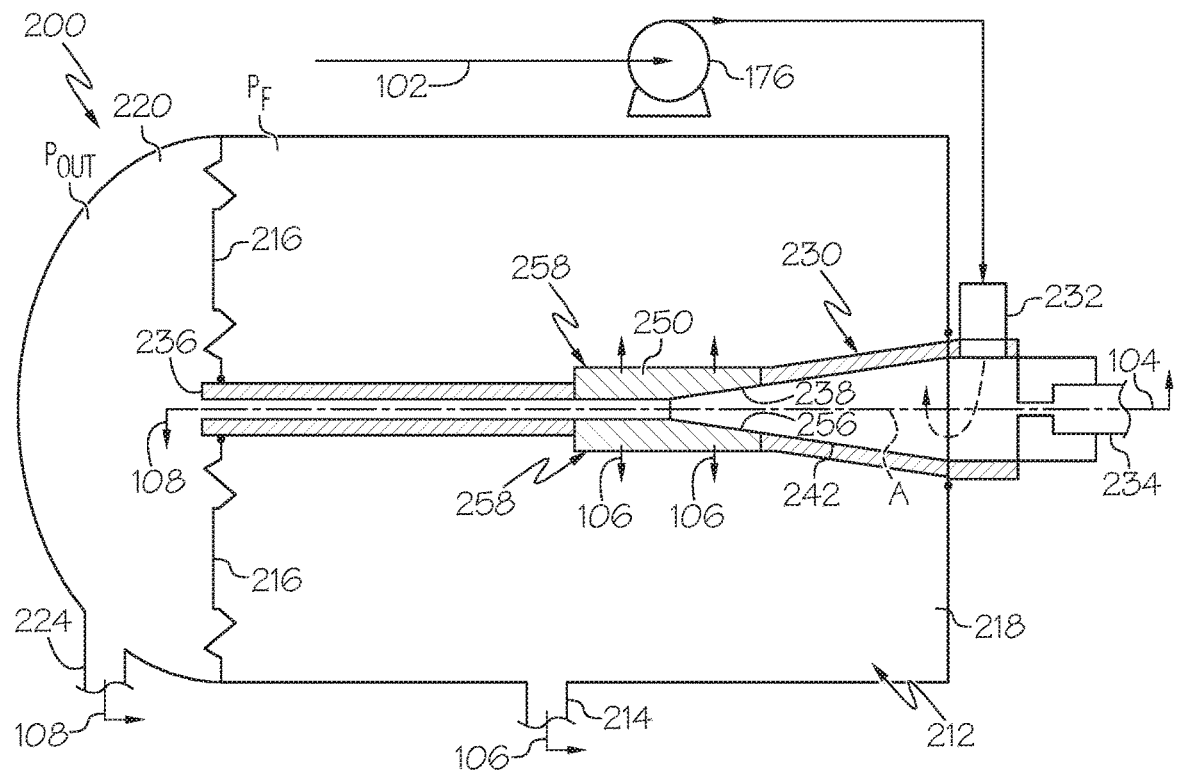
FIG. 7 schematically depicts still another embodiment of a separator, according to one or more embodiments shown and described in the present disclosure.

Referring now to FIG. 7, the separator 200 may include a separator casing 210 having one or more internal walls, such as internal wall 216, that divide the chamber 212 into a plurality of compartments. The separator casing 210 may include 1, 2, 3, or more than 3 internal walls 216 that may separate the chamber 212 into 2, 3, 4, or more than 4 compartments. Each of the compartments may be fluidly isolated from the other compartments by the internal walls. In one or more embodiments, the separator casing 210 may include the internal wall 216 dividing the chamber 212 into a first compartment 218 and a second compartment 220. The first compartment 218 may be in fluid communication with the permeate side 258 of the ceramic membrane 250 and with the permeate outlet 214 of the separator casing 210. The second compartment 220 may be in fluid communication with the accepted outlet 236 of the hydrocyclone 230. The second compartment 220 may include a medium-density fluid outlet 224. The second compartment 220 may provide a flow path between the accepted outlet 236 of the hydrocyclone 230 and the medium-density fluid outlet 224.

In operation, the greater-density fluid 106 may pass through the ceramic membrane 250 into the first compartment 218. At start-up, the first compartment 218 may accumulate the greater-density fluid 106 until the first compartment 218 is full of the greater-density fluid 106. During steady state operation of the separator 200, the first compartment 218 may be full of the greater-density fluid 106. The greater-density fluid 106 may pass out of the first compartment 218 through the permeate outlet 214. The medium-density fluid 108 may pass out of the accepted outlet 236 of the hydrocyclone 230 into the second compartment 220. The medium-density fluid 108 may accumulate in the second compartment 220, completely filling the second compartment 220, and may pass out of the second compartment 220 through the medium-density fluid outlet 224.

In some embodiments, the internal wall 216 of the separator casing 210 may be a flexible membrane or wall that may be operable to equalize the pressure between the first compartment 218 and the second compartment 220. For example, the internal wall 216 may be flexible so that the pressure $P_F$ of the greater-density fluid 106 in the first compartment 218 can be passively controlled to be equal to the pressure $P_{OUT}$ of the medium-density fluid 108 in the second compartment 220. Thus, the presence of flexible internal walls 216 in the separator casing 210 may enable passive pressure control operation of the separator 200.

Figure 8A:
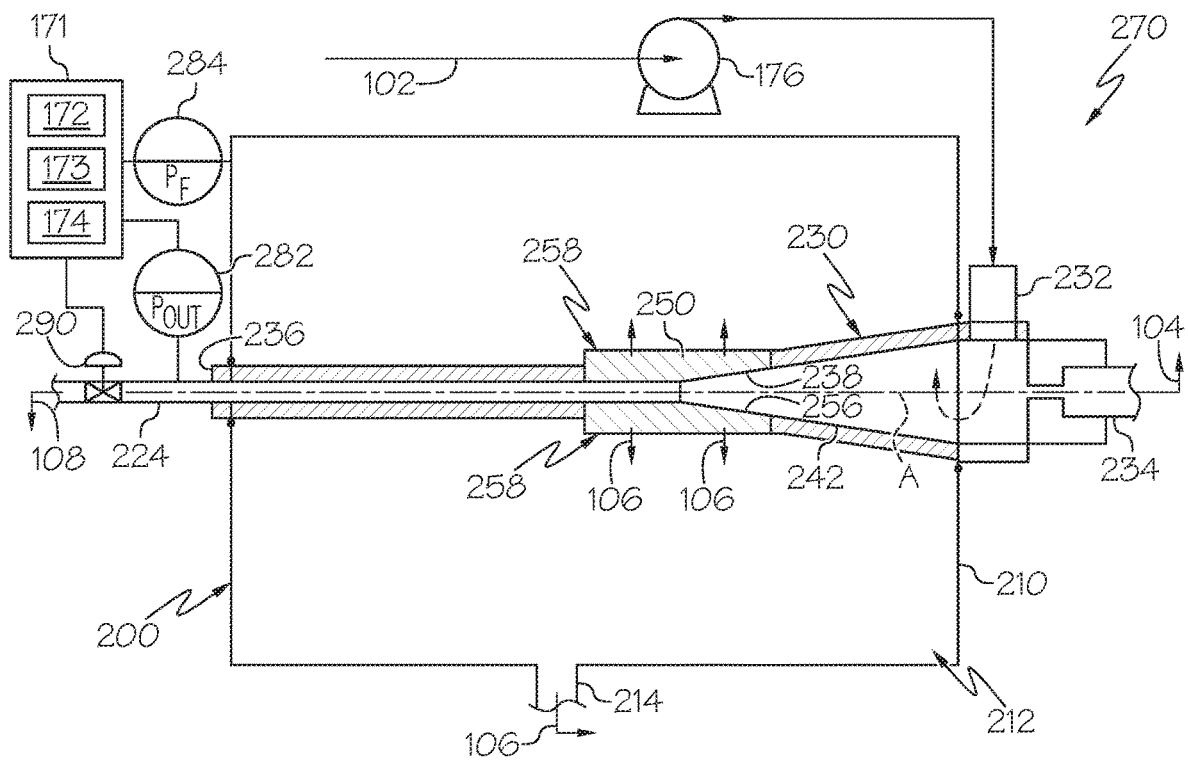
FIG. 8A schematically depicts a separator system comprising the separator of FIG. 5, according to one or more embodiments shown and described in the present disclosure.

Referring now to FIG. 8A, a separator system 270 that includes the separator 200 is depicted. The separator 200 may have any of the features, characteristics, or attributes previously described in the present disclosure for separator 200. The separator system 270 may include at least one pressure sensor, such as a medium-density fluid pressure sensor 282, a greater-density fluid pressure sensor 284, other pressure sensor, or combinations of pressure sensors. The separator system 270 may also include at least one control valve, such as a medium-density fluid control valve 290. The separator system 270 may also include the at least one processor 172 communicatively coupled to the at least one pressure sensor and the control valve. The separator system 270 may further include the at least one memory module 174 communicatively coupled to the processor 172. The separator system 270 may additionally include a pump 176 disposed upstream of the hydrocyclone inlet 232. The pump 176 may be operable to convey the multi-phase composition 102 to the hydrocyclone inlet 232. The pump 176 may also be operable to increase or decrease a flowrate or pressure of the multi-phase composition 102 at the hydrocyclone inlet 232. In one or more embodiments, the processor 172 may be communicatively coupled to the pump 176 or a pump control device attached to the pump 176 to enable control of the pump speed or pumping rate of the pump 176.

The at least one pressure sensor may be operatively coupled to the accepted outlet 236 of the hydrocyclone 230, the medium-density fluid outlet 224 of the separator casing 210, the chamber 212 of the separator casing 210, or the permeate outlet 214 of the separator casing 210. In one or more embodiments, the separator system 270 may include a plurality of pressure sensors, such as a medium-density fluid pressure sensor 282, a greater-density fluid pressure sensor 284, other pressure sensor, or combinations of pressure sensors. The medium-density fluid pressure sensor 282, the greater-density fluid pressure sensor 284, or both, may be any commercially-available pressure sensor. The medium-density fluid pressure sensor 282 and the greater-density fluid pressure sensor 284 may be the same or different. The medium-density fluid pressure sensor 282, the greater-density fluid pressure sensor 284, or both, may be communicatively coupled to the processor 172.

The separator system 270 may include the medium-density fluid pressure sensor 282, which may be operatively coupled to the accepted outlet 236 of the hydrocyclone 230, the medium-density fluid outlet 224 of the separator casing 210, a transfer line downstream of the medium-density fluid outlet 224 or accepted outlet 236, or combinations of these. The medium-density fluid pressure sensor 282 may be operable to determine the pressure $P_{OUT}$ of the medium-density fluid 108 passed out of the accepted outlet 236 of the hydrocyclone 230 or out of the medium-density fluid outlet 224 of the separator casing 210, such as by measuring a force or property indicative of the pressure $P_{OUT}$. In one or more embodiments, the medium-density fluid pressure sensor 282 may be operable to transmit a signal indicative of the pressure $P_{OUT}$ of the medium-density fluid 108 to the processor 172.

The separator system 270 may include the greater-density fluid pressure sensor 284. The greater-density fluid pressure sensor 284 may be operatively coupled to one or more of the separator casing 210, the permeate outlet 214, a transfer line downstream of the permeate outlet 214, or combinations of these. In one or more embodiments, the greater-density fluid pressure sensor 284 may be operatively coupled to the separator casing 210 in fluid communication with the permeate side 258 of the ceramic membrane 250. The greater-density fluid pressure sensor 284 may be operable to determine the pressure $P_F$ of the greater-density fluid 106 in the separator casing 210, the permeate outlet 214, or both, such as by measuring a force or property indicative of the pressure $P_F$. The greater-density fluid pressure sensor 284 may be operable to transmit a signal indicative of the pressure $P_F$ of the greater-density fluid 106 in the separator casing 210 or at the permeate outlet 214 to the processor 172.

Although the separator system 270 is depicted in FIG. 8A as including the processor 172, medium-density fluid pressure sensor 282, and greater-density fluid pressure sensor 284 communicatively coupled together, it is understood that the processor 172, medium-density fluid pressure sensor 282, and greater-density fluid pressure sensor 284 can be integrated into a single device, such as a digital or analog pressure controller that may be operatively coupled to the medium-density fluid control valve 290. It is intended for the present disclosure to include implementation of method steps using either digital or analog techniques and devices.

Referring again to FIG. 8A, the separator system 270 may further include a medium-density fluid control valve 290 operatively coupled to the medium-density fluid outlet 224 of the separator casing 210 or to a transfer pipe or conduit downstream of the medium-density fluid outlet 224 of the separator 200. The medium-density fluid control valve 290 may be communicatively coupled to the processor 172. The medium-density fluid control valve 290 may be operable to receive a signal from the processor 172 indicative of a position of the medium-density fluid control valve 290. In response to the signal received from the processor 172, the medium-density fluid control valve 290 may further be operable to move to a more open or more closed position to increase or decrease, respectively, a flowrate of the medium-density fluid 108 passing out of the medium-density fluid outlet 224 of the separator 200. The medium-density fluid control valve 290 may be any type of commercially-available control valve capable of controlling the flow of a fluid through a conduit or pipe.

Referring again to FIG. 8A, the at least one processor 172 and at least one memory module 174 may be part of the computing device 171, through which embodiments of the present disclosure can be implemented, such as pressure differential control or flowrate control of the separator 200. The computing device 171 may additionally include the network interface 173 operable to communicatively couple the processor 172 to one or more of the memory modules 174, pressure sensors (medium-density fluid pressure sensor 282, the greater-density fluid pressure sensor 284), control valves (medium-density fluid control valve 290), greater-density fluid flowrate sensor 296 (FIG. 9), or combinations of these. The at least one memory module 174 may include machine-readable instructions stored on the memory module 174 that, when executed by the processor 172, may cause the separator system 270 to perform one or more actions.

Referring again to FIG. 8A, the separator system 270 may be operable to control operation of the separator 200 based on the differential pressure between the separator casing 210 and the medium-density fluid outlet 224. The hydrocyclone 230 of the separator 200 may be a static hydrocyclone, meaning that the hydrocyclone is stationary and is not rotated to generate the cyclonic flow. As previously discussed, the separation performance of a static hydrocyclone, such as hydrocyclone 230, may be influenced by the reject ratio, the pressure drop ratio, or both. However, the greater average pore size and porosity of the ceramic membrane 250 integrated into the tapered section 238 of the hydrocyclone 230 may enable the hydrocyclone 230 of separator 200 to be modeled as a division of flow in which the flowrate $Q_{102}$ of the multi-phase composition 102 is equal to the sum of the flowrate $Q_{104}$ of the lesser-density fluid 104, the flowrate $Q_{106}$ of the greater-density fluid 106, and the flowrate $Q_{108}$ of the medium-density fluid 108.

Referring again to FIG. 8A, operation of the separator system 270 may be controlled based on the differential pressure across the ceramic membrane 250. The differential pressure across the ceramic membrane 250 may be proportional to a difference between the pressure $P_{OUT}$ of the medium-density fluid 108 at the accepted outlet 236 of the hydrocyclone 230 and the pressure $P_F$ of the greater-density fluid 106 in the separator casing 210. To control the separator 200 based on the differential pressure between the medium-density fluid 108 and the greater density fluid 106, the separator system 270 may be operable to determine the pressure $P_{OUT}$ of the medium-density fluid 108 at the accepted outlet 236 of the hydrocyclone 230, the pressure $P_F$ of the greater-density fluid 106 in the separator casing 210, or both, using the medium-density fluid pressure sensor 282 and the greater-density fluid pressure sensor 284, respectively. The separator system 270 may be operable to increase or decrease the pressure $P_{OUT}$ of the medium-density fluid 108 at the accepted outlet 236 of the hydrocyclone 230 by adjusting the position of the medium-density fluid control valve 290. For example, the pressure $P_{OUT}$ of the medium-density fluid 108 at the accepted outlet 236 may be increased by adjusting the medium-density fluid control valve 290 to a more closed position and decreased by adjusting the medium-density fluid control valve 290 to a more open position.

Figure 8B:
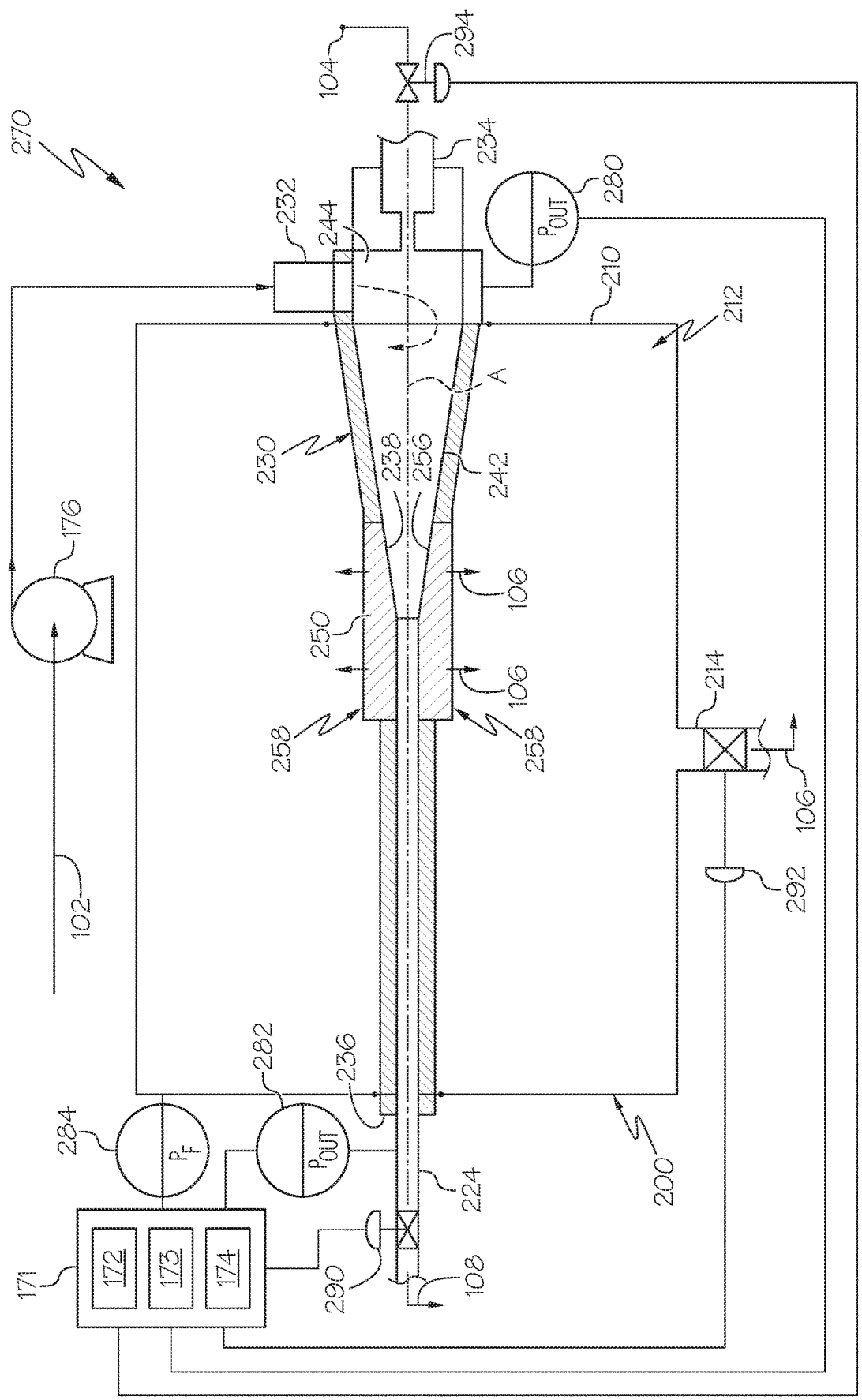
FIG. 8B schematically depicts another separator system comprising the separator of FIG. 5, according to one or more embodiments shown and described in the present disclosure.

Referring now to FIG. 8B, the separator system 270 may further include a hydrocyclone inlet pressure sensor 280 and a greater-density fluid control valve 292. The separator system 270 may also optionally include a lesser-density fluid control valve 294. The hydrocyclone inlet pressure sensor 280 may be operatively coupled to the hydrocyclone inlet 232 of the hydrocyclone 230 or to the cylindrical inlet chamber 244. The hydrocyclone inlet pressure sensor 280 may be any commercially-available pressure sensor. The hydrocyclone inlet pressure sensor 280 may be communicatively coupled to the processor 172. The hydrocyclone inlet pressure sensor 280 may be operable to determine the pressure $P_{IN}$ of the multi-phase composition 102 introduced to the hydrocyclone 230, such as by measuring a force or property indicative of the pressure $P_{IN}$. The hydrocyclone inlet pressure sensor 280 may be operable to transmit a signal indicative of the pressure $P_{IN}$ to the processor 172.

The greater-density fluid control valve 292 may be operatively coupled to the permeate outlet 214 of the separator casing 210 or to a conduit or pipe downstream of the permeate outlet 214. The greater-density fluid control valve 292 may be communicatively coupled to the processor 172. The greater-density fluid control valve 292 may be operable to receive a signal from the processor 172 indicative of a position of the greater-density fluid control valve 292. In response to the signal received from the processor 172, the greater-density fluid control valve 292 may be further operable to move to a more open or more closed position to increase or decrease a flowrate of the greater-density fluid 106 passing out of the permeate outlet 214 of the separator casing 210.

The lesser-density fluid control valve 294 may be operatively coupled to the reject outlet 234 or to a conduit or pipe downstream of the reject outlet 234 of the hydrocyclone 230. The lesser-density fluid control valve 294 may be communicatively coupled to the processor 172. The lesser-density fluid control valve 294 may be operable to receive a signal from the processor 172 indicative of a position of the lesser-density fluid control valve 294. In response to the signal received from the processor 172, the lesser-density fluid control valve 294 may be further operable to move to a more open or more closed position to increase or decrease a flowrate of the lesser-density fluid 104 passing out of the reject outlet 234 of the hydrocyclone 230. The greater-density fluid control valve 292 and the lesser-density fluid control valve 294 may be any type of commercially-available control valve capable of controlling the flow of a fluid through a conduit or pipe.

Referring again to FIG. 8B, the network interface 173 of the computing device 171 may be operable to communicatively couple the processor 172 to one or more of the memory modules 174, pressure sensors (medium-density fluid pressure sensor 282, the greater-density fluid pressure sensor 284, the hydrocyclone inlet pressure sensor 280), control valves (medium-density fluid control valve 290, greater-density fluid control valve 292, lesser-density fluid control valve 294), greater-density fluid flowrate sensor 296 (FIG. 9), or combinations of these. The separator system 270 may be operable to further control operation of the separator 200 based on the measured $P_{IN}$ of the multi-phase composition 102 introduced to the hydrocyclone 230 in addition to the pressure of the medium-density fluid 108 at the accepted outlet 236 of the hydrocyclone 230 ($P_{OUT}$), the greater-density fluid 106 in the separator casing 210 or at the permeate outlet 214 of the separator casing 210 ($P_F$), or both. The inlet pressure $P_{IN}$ of the multi-phase composition 102 may be modified by increasing or decreasing flow of fluids through the medium-density fluid control valve 290, the greater-density fluid control valve 292, the lesser-density fluid control valve 294, or combinations of these. The separator system 270 of FIG. 8B may be operable to control the separator 200 based on the pressure drop ratio C of the hydrocyclone 130 in addition to controlling the separator 200 based on the pressure differential between the separator casing 210 and the medium-density fluid outlet 224 (pressure drop across the ceramic membrane 250).

Referring to FIG. 8B, the processor 172 of the separator system 270 may be communicatively coupled to the hydrocyclone inlet pressure sensor 280, the medium-density fluid pressure sensor 282, the greater-density fluid pressure sensor 284, the medium-density fluid control valve 290, the greater-density fluid control valve 292, the lesser-density fluid control valve 294, or combinations of these. Communication may be provided by the at least one network interface 173. The at least one memory module 174 may be communicatively coupled to the at least one processor 172. The separator system 270 may further include machine readable instructions stored on the at least one memory module 174. The machine readable instructions, when executed by the at least one processor 172, may cause the separator system 270 to measure the pressure of the medium-density fluid 108 at the accepted outlet 236 of the hydrocyclone 230 ($P_{OUT}$), the greater-density fluid 106 in the separator casing 210 or at the permeate outlet 214 of the separator casing 210 ($P_F$), the pressure of the multi-phase composition 102 introduced to the hydrocyclone 230 ($P_{IN}$), or combinations of these. The machine readable instructions, when executed by the at least one processor 172, may cause the separator system 270 to control the at least one control valve, such as the medium-density fluid control valve 290, greater-density control valve 292, lesser-density control valve 294, or combinations of these, based on the measured pressure or pressures. In one or more embodiments, the machine readable instructions, when executed by the at least one processor 172, may further cause the separator system 270 to compare the measured pressure or pressures against a target pressure for the medium-density fluid 108 at the accepted outlet 236 of the hydrocyclone 230 ($P_{OUT}$), the greater-density fluid 106 in the separator casing 210 or at the permeate outlet 214 of the separator casing 210 ($P_F$), the multi-phase composition 102 at the hydrocyclone inlet 232 ($P_{IN}$), or combinations of these, and control the at least one control valve, such as the medium-density fluid control valve 290, greater-density control valve 292, lesser-density control valve 294, or combinations of these, based on the comparison.

Figure 9:
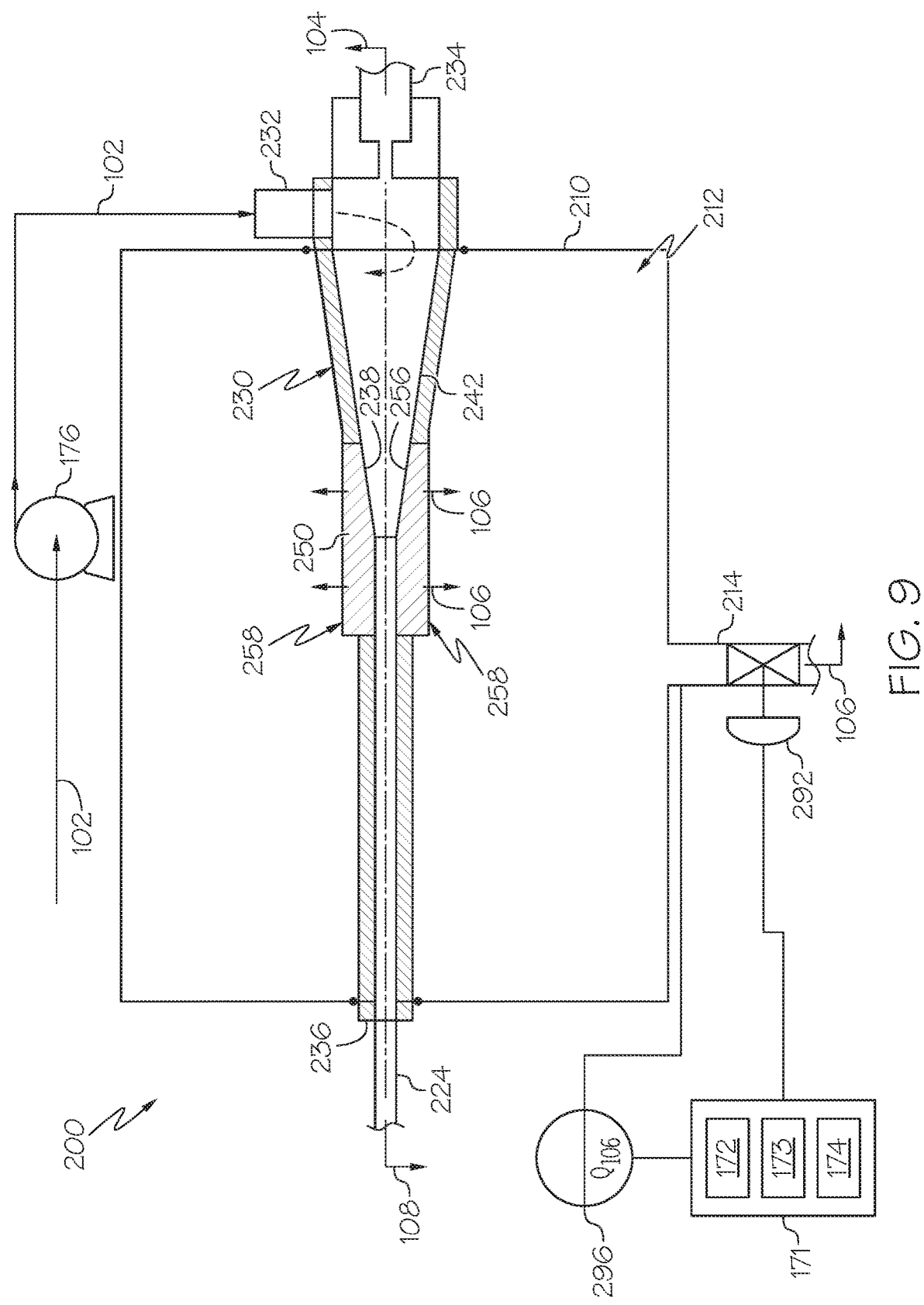
FIG. 9 schematically depicts another embodiment of a separator system comprising the separator of FIG. 5, according to one or more embodiments shown and described in the present disclosure.

Referring to FIG. 9, the separator system 270 may include a greater-density fluid flowrate sensor 296. The greater-density fluid flowrate sensor 296 may be disposed proximate the permeate outlet 214 of the separator casing 210 or in a transfer conduit or pipe downstream of the permeate outlet 214. The greater-density fluid flowrate sensor 296 may be operable to determine a flowrate $Q_{106}$ of the greater-density fluid 106 passing out of the permeate outlet 214 of the separator casing 210. The greater-density fluid flowrate sensor 296 may be any type of commercially-available device operable to determine the flowrate of a fluid, such as the flowrate of a fluid passing through a pipe or conduit. The separator system 270 may also include the greater-density fluid control valve 292 operatively coupled to the permeate outlet 214 of the separator casing 210 or to a conduit or pipe downstream of the permeate outlet 214. The greater-density fluid control valve 292 was previously described in relation to FIG. 8B and may have any of the previously described features.

Referring to FIG. 9, the separator system 270 may be operable to control operation of the separator 200 based on the flowrate of the greater-density fluid 106 passed out of the separator casing 210 from the permeate outlet 214. The separator system 270 may include the greater-density fluid flowrate sensor 296 and the greater-density fluid control valve 292. In some embodiments, the greater-density fluid control valve 292 may be disposed downstream of the greater-density fluid flowrate sensor 296. The separator system 270 may be operable to measure the flowrate of the greater-density fluid 106 using the greater-density fluid flowrate sensor 296 operatively coupled to the permeate outlet 214. The separator system 270 may be further operable to adjust the position of the greater-density fluid control valve 292 based on the measured flowrate of the greater-density fluid 106.

The separator system 270 may include machine readable instructions stored on the at least one memory module 174 that, when executed by the processor 172, may cause the separator system 270 to measure the flowrate $Q_{106}$ of the greater-density fluid 106 passing out of the permeate outlet 214 of the separator casing 210, and control the at least one control valve, such as the greater-density fluid control valve 292, based on the measured flowrate $Q_{106}$ of the greater-density fluid 106.

Figure 10:
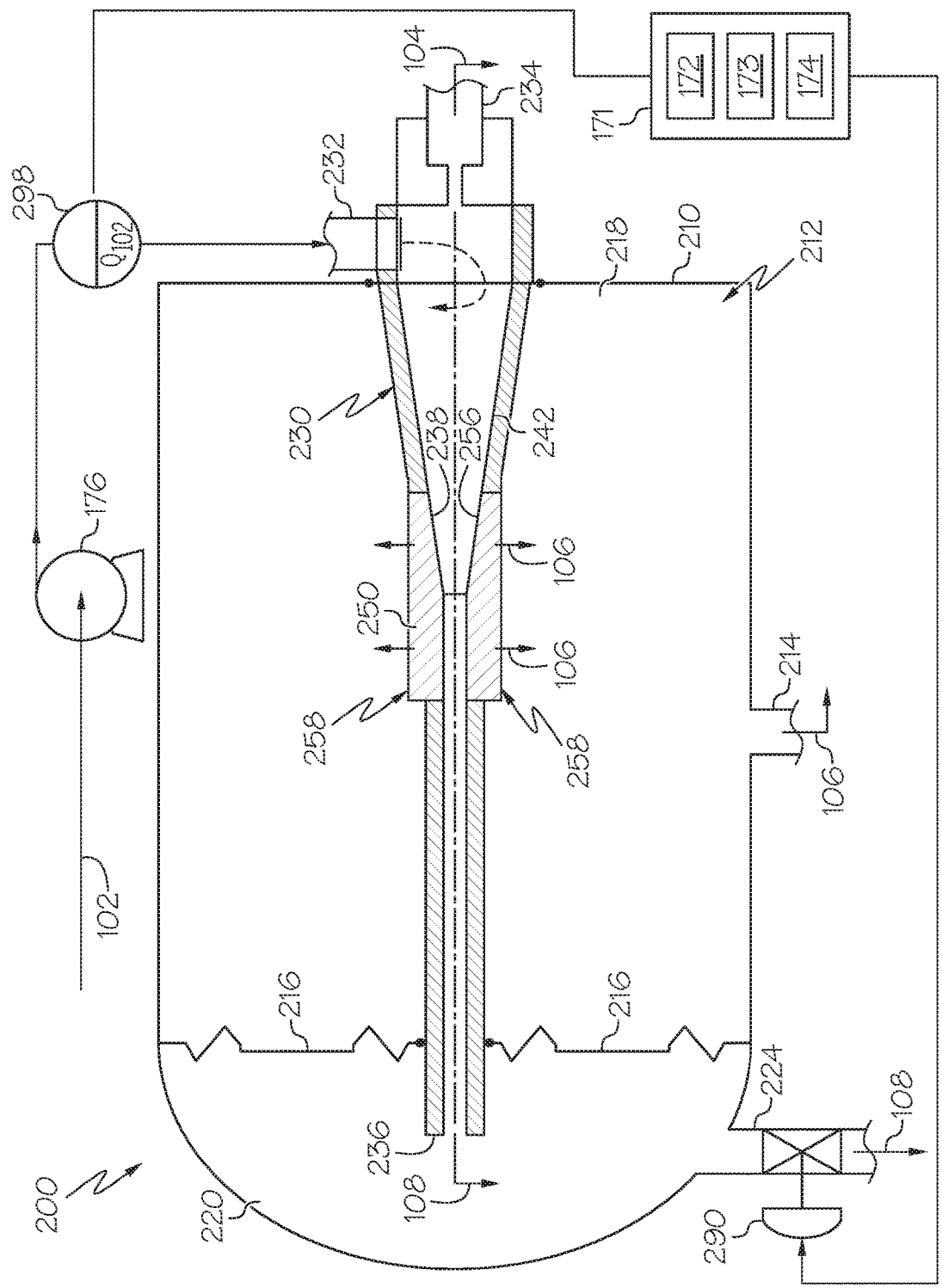
FIG. 10 schematically depicts a separator system comprising the separator of FIG. 7, according to one or more embodiments shown and described in the present disclosure.

Referring now to FIG. 10, when the separator 200 includes an internal wall 216 dividing the chamber 212 into the first compartment 218 and the second compartment 220, the separator system 270 may be operable to control operation of the separator 200 based on the flowrate of the multi-phase composition 102 introduced to the separator 200. The separator system 270 may include the separator casing 210 that includes an internal wall 216 dividing the chamber 212 into the first compartment 218 comprising the permeate outlet 214 and the second compartment 220 comprising the medium-density fluid outlet 224. The internal wall 216 may be a flexible wall operable to equalize the pressure between the greater-density fluid 106 in the first compartment 218 and the medium-density fluid 108 in the second compartment 220. The accepted outlet 236 of the hydrocyclone 230 may be in fluid communication with the second compartment 220, and the permeate side 238 of the ceramic membrane 250 may be in fluid communication with the first compartment 218.

The separator system 270 may include an inlet flowrate sensor 298 operatively coupled to the hydrocyclone inlet 232 or to a transfer pipe or conduit upstream of the hydrocyclone inlet 232. The inlet flowrate sensor 298 may be operable to determine a flowrate of the multi-phase composition 102 introduced to the hydrocyclone inlet 232. The inlet flowrate sensor 298 may be operable to transmit a signal indicative of the flowrate of the multi-phase composition 102 introduced to the hydrocyclone inlet 232. The inlet flowrate sensor 298 may be communicatively coupled to the processor 172. The inlet flowrate sensor 298 may be any type of commercially-available flowrate sensor or flowmeter operable to determine the flowrate of a fluid through a conduit.

The separator system 270 may include the medium-density fluid control valve 290 operatively coupled to the medium-density fluid outlet 224 of the second compartment 220 of the separator casing 210 or to a conduit or pipe downstream of the medium-density fluid outlet 224. The medium-density fluid control valve 290 may be communicatively coupled to the processor 172 and may be operable as previously described in this disclosure. The medium-density fluid control valve 290, the inlet flowrate sensor 298, or both may be communicatively coupled to the processor 172 through the network interface 173.

Referring again to FIG. 10, the separator system 270 may be operable to control operation of the separator 200 based on the flowrate of the multi-phase composition 102 introduced to the separator 200. The separator system 270 may be operable to measure the flowrate of the multi-phase composition 102 introduced to the separator 200 using the inlet flowrate sensor 298. The separator system 270 may be further operable to adjust the position of the greater-density fluid control valve 292 based on the measured flowrate of the multi-phase composition 102 introduced to the separator 200.

The separator system 270 may include machine readable instructions stored on the at least one memory module 174 that, when executed by the processor 172, may cause the separator system 270 to measure the flowrate $Q_{IN}$ of the multi-phase composition 102 introduced to the hydrocyclone 230 and control the at least one control valve, such as the medium-density fluid control valve 290, based on the measured flowrate $Q_{IN}$ of the multi-phase composition 102 introduced to the hydrocyclone 230. In some embodiments, the machine readable instructions stored on the memory module 174, when executed by the processor 172, may cause the separator system 270 to compare the flowrate $Q_{IN}$ of the multi-phase composition 102 to a target flowrate and move the medium-density fluid control valve 290 to a more open or more closed position based on the comparison.

Referring again to FIG. 5, a method of separating the multi-phase composition 102 having an aqueous phase, an oleaginous phase, and a solid phase may include passing the multi-phase composition 102 to the separator 200, which may have any of the features or characteristics previous described in this disclosure for separator 200. The separator 200 may be operable to separate the multi-phase composition 102 into the lesser-density fluid 104, the medium-density fluid 108, and the greater-density fluid 106. The method may further include collecting the lesser-density fluid 104 from the reject outlet 234 of the hydrocyclone 230, collecting the greater-density fluid 106 from the permeate outlet 214 of the separator casing 210, and collecting the medium-density fluid 108 from the medium-density fluid outlet 224 of the separator 200.

Referring again to FIG. 8A, the method may further include determining a pressure of the medium-density fluid 108 at the accepted outlet 236 of the hydrocyclone 230 ($P_{OUT}$), a pressure of the greater-density fluid 106 in the separator casing 210 ($P_F$), or both, and increasing or decreasing flow of the medium-density fluid 108 passed out of the medium-density fluid outlet 224 of the separator 200 based on the measured pressure. Increasing or decreasing the flow of the medium-density fluid 108 passed out of the medium-density fluid outlet 224 may decrease or increase, respectively, the pressure $P_{OUT}$ of the medium-density fluid 108 at the accepted outlet 236 of the hydrocyclone 230. The flow of the medium density fluid 108 passed out of the medium-density fluid outlet 224 may be increased or decreased by moving the medium-density fluid control valve 290 to a more open or a more closed position, respectively. In some embodiments, the method may include determining the pressure of the medium-density fluid 108 at the accepted outlet 236 ($P_{OUT}$) and the pressure of the greater-density fluid 106 in the separator casing 210 ($P_F$), comparing the pressure of the medium-density fluid 108 at the accepted outlet 236 ($P_{OUT}$) to the pressure of the greater-density fluid 106 in the separator casing 210 ($P_F$), and increasing or decreasing flow of the medium-density fluid 108 passed out of the medium-density fluid outlet 224 based on the comparison.

Referring to FIG. 8B, in one or more embodiments, the method may further include determining a pressure of the medium-density fluid 108 at the accepted outlet 236 of the hydrocyclone 230 ($P_{OUT}$), a pressure of the greater-density fluid 106 in the separator casing 210 ($P_F$), a pressure of the multi-phase composition 102 introduced to the hydrocyclone 230, or combinations of these, and increasing or decreasing flow of the medium-density fluid 108 passed out of the medium-density fluid outlet 224, the greater-density fluid 106 passed out of the greater-density fluid outlet 214, the lesser-density fluid 104 passed out of the lesser-density fluid outlet 234, or combinations of these based on the measured pressure.

Referring to FIG. 9, the method may include determining the flowrate of the greater-density fluid 106 at the permeate outlet 214 of the separator casing 210 and increasing or decreasing the flowrate of the greater-density fluid 106 passed out of the permeate outlet 214 based on the measured flowrate. The flowrate of the greater-density fluid 106 passed out the permeate outlet 214 may be increased or decreased by moving the greater-density fluid control valve 292 to a more open or a more closed position, respectively. The method may further include comparing the determined flowrate of the greater-density fluid 106 at the permeate outlet 214 with a target flowrate of the greater-density fluid 106 and increasing or decreasing the flowrate of the greater-density fluid control valve 292 based on the comparison.

Referring to FIG. 10, the separator 200 may include the flexible internal wall 216 dividing the chamber 212 into the first compartment 218 that includes the permeate outlet 214 and the second compartment 220 that includes the medium-density fluid outlet 224. The accepted outlet 236 of the hydrocyclone 230 may be in fluid communication with the second compartment 220, and the permeate side 258 of the ceramic membrane 250 may be in fluid communication with the first compartment 218. The method may further include determining the flowrate $Q_{102}$ of the multi-phase composition 102 introduced to the hydrocyclone 230 and increasing or decreasing a flowrate of the medium-density fluid 108 passed out of the medium-density fluid outlet 224 based on the measured flowrate. The method may further include comparing the determined flowrate $Q_{102}$ to a target flowrate for the multi-phase composition 102 and increasing or decreasing the flowrate of the medium-density fluid 108 passed out of the medium-density fluid outlet 224 based on the comparison. The flowrate of the medium-density fluid 108 passed out of the medium-density fluid outlet 224 may be increased or decreased by moving the medium-density fluid control valve 290 to a more open or a more closed position, respectively.

Although the separator systems 270 are depicted in FIGS. 8, 9, and 10 as including the computing device 171 having processor 172 communicatively coupled to various pressure sensors, flowrate sensors, and control valves, it is understood that the methods of pressure drop ratio control or flowrate control of the separator 200 may be accomplished using one or more analog techniques or devices as an alternative to or in addition to controls using the computing device 171. It is intended for the methods of the present disclosure to include implementation of method steps using either digital or analog technologies.

The separators 100, 200 and separator systems 170, 270 of the present disclosure may be used to separate multi-phase compositions 102 into a plurality of streams of different density. For example, the separators 100, 200 and separator system 170, 270 may be used to process produced water from hydrocarbon drilling or production operations. Produced water from hydrocarbon drilling and production may include an aqueous phase, an oleaginous phase, and suspended solids. Produced water may be directly introduced to the separators 100, 200 or the present disclosure, such as when used on drilling platforms for underwater drilling operations. In some situations, the separators 100, 200 may be incorporated into a larger gas oil separation plant (GOSP) in which the produced water may be first introduced to an oil/water gravity separator system and an effluent from the oil/water gravity separator system may be introduced to the separators 100, 200 of the present disclosure. The separators 100, 200 of the present disclosure may also be useful for separating multi-phase compositions in other industries, such as food processing, mining, environmental remediation, chemical processing, manufacturing, municipal or storm water treatment, or other industries.

The separators 100, 200 and separator system 170, 270 of the present disclosure may be operable to produce a medium-density fluid 108 that is primarily water. The medium density fluid 108 produced using the separators 100, 200 of the present disclosure may have a concentration of oil of less than 5 parts per million by volume and reduced suspended solids compared to the starting multi-phase composition 102. The medium-density fluid 108 (water) produced by the separators 100, 200 may be capable of meeting water quality standards for use of the water in oil field applications, such as reservoir flooding, hydraulic fracturing, or other enhanced oil recovery methods. In some applications, the medium-density fluid 108 may be passed to a downstream process for further treatment, such as desalination.

The lesser-density fluid 104 may include the greatest portions of oil droplets and other organic compounds. The lesser-density fluid 104 may be passed to one or more downstream processing systems for recovering oil and other organic compounds. The greater-density fluid 106 may include the greatest portion of solids, such as sand, rock particles, dirt or other solid particles. The greater-density fluid 106 may be processed for disposal. In some systems, the greater-density fluid 106 may be passed back to a settling system such as a settling tank or pond, an oil/water gravity separator of a GOSP, or other treatment process.

The computing device 171 described in the present disclosure is one contemplated example of a suitable computing device and does not suggest any limitation on the scope of any embodiments presented. Nothing illustrated or described with respect to the computing device 171 should be interpreted as being required or as creating any type of dependency with respect to any element or plurality of elements of the present disclosure. It is understood that various methods and control schemes described in the present disclosure may be implemented using one or more analog control devices in addition to or as an alternative to the computing device 171. The computing device 171 may include, but is not limited to, an industrial controller, desktop computer, laptop computer, server, client computer, tablet, smartphone, or any other type of device that can send data, receive data, store data, and perform one or more calculations. In an embodiment, the computing device 171 includes at least one processor 172 and at least one memory module 174 (non-volatile memory 708 and/or volatile memory 710).

The computing device 171 can include a display and may be communicatively coupled to one or more output devices, such as, but not limited to, the retentate control valve 190, the permeate control valve 192, the lesser-density fluid control valve 194, the inlet pump 176, medium-density fluid control valve 290, greater-density fluid control valve 292, or combinations of these. The computing device 171 may further include one or more input devices which can include, by way of example, any type of mouse, keyboard, keypad, push button array, switches, disk or media drive, memory stick (thumb drive), memory card, pen, touch-input device, biometric scanner, audio input device, pressure sensor, flowrate sensor, temperature sensor, other sensor, or combinations of these. In one or more embodiments, the input devices may include one or a plurality of the pressure sensors disclosed in the present disclosure, the flowrate sensors disclosed in the present disclosure, or combinations of these.

The at least one memory module 174 of the computing device 171 may include a non-volatile memory (ROM, flash memory, etc.), volatile memory (RAM, etc.), or a combination of these. The computing device 171 can include a network interface 173, which can facilitate communication with the input devices and output devices or over a network via wires, via a wide area network, via a local area network, via a personal area network, via a cellular network, via a satellite network, or a combination of these. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, other near field communication protocols, or combinations of these. Suitable personal area networks may similarly include wired computer buses such as, for example, USB and FireWire. Suitable cellular networks include, but are not limited to, technologies such as LTE, WiMAX, UMTS, CDMA, and GSM. Network interface 173 can be communicatively coupled to any device capable of transmitting data, receiving data, or both via a network.

The hardware of the network interface 173 can include a communication transceiver for sending, receiving, or both, any wired or wireless communication. Various components, such as the pressure sensors, flowrate sensors, pumps, control valves, or other sensors or control devices may utilize the network interface 173 to communicate with the processor 172 through the network. For example, the hardware of the network interface 173 may include an antenna, a modem, LAN port, Wi-Fi card, WiMax card, mobile communications hardware, near-field communication hardware, satellite communication hardware and/or any wired or wireless hardware for communicating with other networks and/or devices.

The one or more memory modules 174 may include one or a plurality of computer readable storage mediums, each of which may be either a computer readable storage medium or a computer readable signal medium. A computer readable storage medium may reside, for example, within an input device, non-volatile memory, volatile memory, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave.

The depictions of the computing device 171 in the drawings are simplified representations of the computing device 171. Many components of the computing device 171 have been omitted for purposes of clarity. Assembling various hardware components into a functioning computing device 171 is considered to be part of the ordinary skill in the art.

It is noted that recitations herein of a component of the present disclosure being "configured," "structured," or "programmed" in a particular way, to embody a particular property, or to function in a particular manner, are structural recitations, as opposed to recitations of intended use. More specifically, the references herein to the manner in which a component is "configured," "structured," or "programmed" denotes an existing physical condition of the component and, as such, is to be taken as a definite recitation of the structural characteristics of the component.

EXAMPLES

Figure 11:
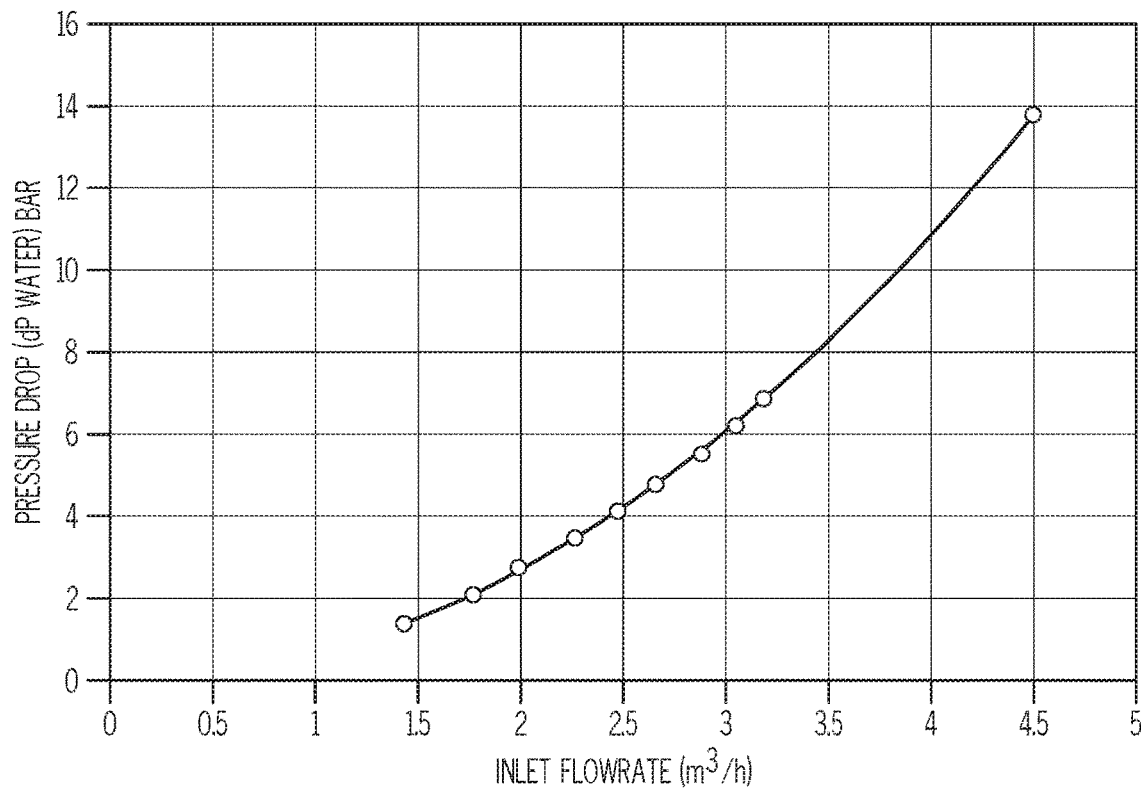
FIG. 11 graphically depicts a pressure drop between a hydrocyclone inlet and an accepted outlet (y-axis) as a function of inlet flowrate (x-axis) for a hydrocyclone of the separator of FIG. 1, according to one or more embodiments shown and described in the present disclosure.

The following examples illustrate one or more additional features of the separators of the present disclosure. In the following examples, a separator according to the separator 100 depicted in FIG. 1 was modeled. Operation of the hydrocyclone 130 was modeled based on data obtained from existing hydrocyclones typically used for water-oil separations in the hydrocarbon drilling, production, and refining industry. Referring to FIG. 11, the relationship between the inlet flowrate ($Q_{102}$) of the fluid introduced to the hydrocyclone 130 and the pressure drop from the hydrocyclone inlet 132 to the accepted outlet 136 ($dP_{Water}$) is depicted.

Referring to FIG. 3, the outlet pressure ($P_{OUT}$) of the intermediate fluid 140 at the accepted outlet 136 and the pressure ($P_L$) of the lesser-density fluid 104 at the reject outlet 134 as a function of the pressure drop ($dP_{Water}$) and the inlet pressure ($P_{IN}$) are provided below in Equation 3 (EQU. 3) and Equation 4 (EQU. 4).

$$P_{OUT} = P_{IN} - dP_{Water} \qquad \text{EQU. 3}$$

$$P_L = P_{IN} - C \times dP_{Water} \qquad \text{EQU. 4}$$

The outlet pressure $P_H$ of the greater-density fluid 106 downstream of the greater-density fluid outlet 124 is assumed to be constant at 6.9 bar (690 kilopascals (kPa) or 100 pounds per square inch (psi)). With this outlet pressure $P_H$ and the inlet pressure $P_{IN}$, the operational envelope for the system may be calculated for C=2 (provided in Table 1) and C=1.5 (provided in Table 2). The inlet flowrates $Q_{102}$ are provided in Tables 1 and 2 in units of cubic meters per hour ($m^3/h$).

TABLE 1

Operational envelop of inlet pressure $P_{IN}$ (kPa) as a function of inlet flowrate $Q_{102}$ and a hypothetical input of pressure $P_{IN}*$ for a pressure drop ration C of 2.0

| $Q_{102}$ | Hypothetical Input of Pressure $P_{IN}*$ (kPa) | | | | | | | | | | | |
|---|---|---|---|---|---|---|---|---|---|---|---|---|
| (m³/h) | 800 | 900 | 1000 | 1100 | 1200 | 1300 | 1400 | 1500 | 1600 | 1700 | 1800 | 1900 |
| 1.77 | — | — | — | — | — | — | — | — | — | — | — | — |
| 1.99 | 772 | — | — | — | — | — | — | — | — | — | — | — |
| 2.27 | — | 766 | 966 | — | — | — | — | — | — | — | — | — |
| 2.47 | — | — | 759 | 959 | 1159 | — | — | — | — | — | — | — |
| 2.65 | — | — | — | 752 | 952 | 1152 | 1352 | — | — | — | — | — |
| 2.88 | — | — | — | — | 745 | 945 | 1145 | 1345 | 1545 | — | — | — |
| 3.05 | — | — | — | — | — | 738 | 938 | 1138 | 1338 | 1538 | 1738 | — |
| 3.18 | — | — | — | — | — | — | 731 | 931 | 1131 | 1331 | 1531 | 1731 |
| 4.50 | — | — | — | — | — | — | — | — | — | — | — | — |

TABLE 2

Operational envelop of inlet pressure $P_{IN}$ (kPa) as a function of inlet flowrate $Q_{102}$ and a hypothetical input of pressure $P_{IN}*$ for a pressure drop ration C of 1.5

| $Q_{102}$ | Hypothetical Input of Pressure $P_{IN}*$ (kPa) | | | | | | | | | | | |
|---|---|---|---|---|---|---|---|---|---|---|---|---|
| (m³/h) | 800 | 900 | 1000 | 1100 | 1200 | 1300 | 1400 | 1500 | 1600 | 1700 | 1800 | 1900 |
| 1.99 | — | — | — | — | — | — | — | — | — | — | — | — |
| 2.27 | 738 | — | — | — | — | — | — | — | — | — | — | — |
| 2.47 | — | 766 | 966 | — | — | — | — | — | — | — | — | — |
| 2.65 | — | — | 793 | 993 | 1193 | — | — | — | — | — | — | — |
| 2.88 | — | — | — | 821 | 1021 | 1221 | — | — | — | — | — | — |
| 3.05 | — | — | — | — | 848 | 1048 | 1248 | 1448 | — | — | — | — |
| 3.18 | — | — | — | — | — | 876 | 1076 | 1276 | 1476 | 1676 | — | — |
| 4.50 | — | — | — | — | — | — | — | — | — | — | — | — |

For a pressure drop ratio C equal to 2 and inlet flowrate $Q_{102}$ in a range of from 2.65 m³/h to 3.18 m³/h, the water recovery rate from the separator 100 may be calculated based on a commercial cross-flow ceramic membrane having a length of 1 meter and 10 tubes having an inner diameter of 1 centimeter. The ceramic membrane has an average pore size of 140 nanometers and is constructed of a ceramic material comprising titania ($TiO_2$) and zirconia ($ZrO_2$). The specific permeate flux of the ceramic membrane 150 and, therefore, the flowrate $Q_F$ for the medium-density fluid 108 passing through the ceramic membrane 150 can be determined according to the following Equation 5 (EQU. 5) for a linear speed of the fluid in the tubes of 4.5 meters per second.

$$Q_F = 3990 \times TMP; \quad 0 \leq TMP \leq 0.5 \text{ bar} \qquad \text{EQU. 5}$$

Figure 12:
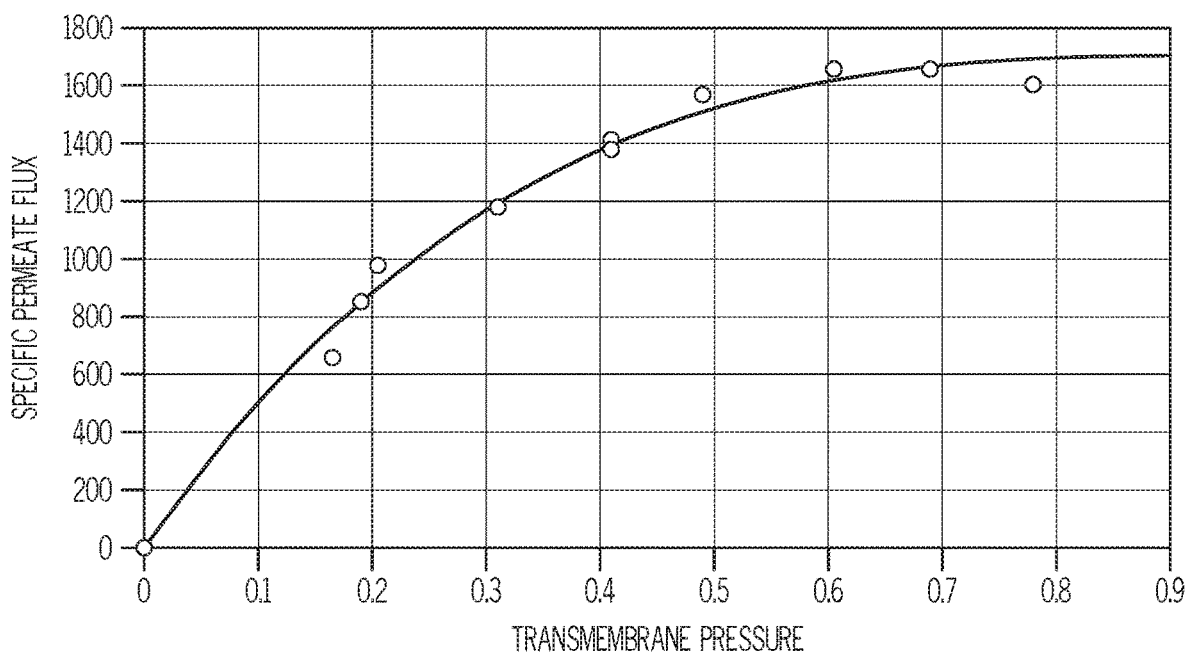
FIG. 12 graphically depicts a specific permeate flux (y-axis) as a function of a transmembrane pressure (x-axis) for a ceramic membrane of the separator of FIG. 1, according to one or more embodiments shown and described in the present disclosure.

In EQU. 5, TMP is the transmembrane pressure in bar (where 1 bar=100 kilopascals (kPa)). EQU. 5 was derived from the relationship between the specific permeate flux and the transmembrane pressure (TMP) which is graphically depicted in FIG. 12.

With these parameters and using Equations 1-5, the water recovery $R_C$ of the system is calculated for one ceramic membrane 150 (previously described), a transmembrane pressure of 0.5 bar (50 kPa), a pressure drop ratio C of 2, a reject ratio $R_R$ of 2%, and an inlet flowrate ($Q_{IN}$) in a range of from 2.65 m³/h to 3.18 m³/h. The inlet pressure ($P_{IN}$) ranges from 13.5 bar (1350 kPa) to 7.3 bar (730 kPa) over the range of the inlet flowrate ($Q_{IN}$), respectively. The flowrate ($Q_F$) of the medium-density fluid 108 is maintained constant at 636.84 liters per hour (0.63684 m³/hr) and the outlet pressure ($P_H$) of the greater-density fluid 106 is maintained constant at 6.9 bar (690 kPa). The water recovery $R_C$ is calculated as the ratio between the permeate flowrate $Q_F$ (flowrate of the medium-density fluid 108 passing through the ceramic membrane 150) and the amount of water entering the ceramic membranes Qout ($Q_{102}-Q_{104}$). The equation for calculating water recovery $R_C$ is shown below in Equation 6 (EQU. 6).

$$R_C = \frac{Q_F}{Q_{OUT}} \times 100; \quad Q_{OUT} = Q_{102} - Q_{104} \qquad \text{EQU. 6}$$

The water recovery calculated for these Examples is provided in Table 3 as a percentage.

TABLE 3

Calculated parameters for the separator 100 of the Examples.

| $Q_{IN}$ m³/h ($Q_{102}$) | $P_{IN}$ bar | $P_{Out}$ bar | $P_F$ bar | $P_L$ bar | $Q_{106}$ m³/h | $Q_{104}$ m³/h | $Q_{OUT}$ m³/h | Rc % | Stage |
|---|---|---|---|---|---|---|---|---|---|
| 2.65 | 13.52 | 9.17 | 7.53 | 4.34 | 1.96 | 0.05 | 2.60 | 24.52 | 2 |
| 2.88 | 11.45 | 8.48 | 7.19 | 2.97 | 2.19 | 0.06 | 2.82 | 22.55 | 2 |
| 3.05 | 9.38 | 7.79 | 6.84 | 1.59 | 2.35 | 0.06 | 2.99 | 21.33 | 2 |
| 3.18 | 7.31 | 7.10 | 6.50 | 0.21 | 2.48 | 0.06 | 3.12 | 20.44 | 2 |

The water recovery $R_C$ in these conditions will be of approximately 25% for a surface area of 0.32 m², which is the surface area for a single ceramic membrane unit as described in these examples. If a water recovery of 50% is required, the surface area of the ceramic membrane will double. Therefore, two ceramic membranes may be provided to increase the water recovery to 50%, as indicated by the stage equal to 2 in Table 3. The water recovery may be further increased by adding additional ceramic membranes.

In a first aspect of the present disclosure, a separator includes a separator casing defining a chamber and having a permeate outlet, at least one hydrocyclone disposed within the separator casing, and at least one ceramic membrane disposed within the separator casing and downstream of an accepted outlet of the hydrocyclone. The at least one hydrocyclone may include a hydrocyclone inlet, a tapered section downstream of the hydrocyclone inlet, a reject outlet proximate a wide end of the tapered section, and an accepted outlet proximate a narrow end of the tapered section. The ceramic membrane may include at least one cylindrical tube, a membrane inlet, a retentate outlet, a retentate side defining the at least one cylindrical tube, and a permeate side, where the permeate side is in fluid communication with the chamber.

A second aspect of the present disclosure may include the first aspect, in which the membrane inlet of the at least one ceramic membrane may be in fluid communication with the accepted outlet of the at least one hydrocyclone.

A third aspect of the present disclosure may include any one of the first or second aspects, in which the at least one ceramic membrane may comprise a plurality of cylindrical tubes extending from the membrane inlet to the retentate outlet.

A fourth aspect of the present disclosure may include any one of the first through third aspects, in which the separator may include a plurality of ceramic membranes, where the membrane inlet of each of the plurality of ceramic membranes may be in fluid communication with the accepted outlet of the at least one hydrocyclone and the permeate side of each of the plurality of ceramic membranes may be in fluid communication with the chamber.

A fifth aspect of the present disclosure may include any one of the first through fourth aspects, in which the separator casing may comprise one or a plurality of internal walls dividing the chamber into at least a first compartment and a second compartment. The first compartment may be in fluid communication with the accepted outlet of the at least one hydrocyclone and the membrane inlet of the at least one ceramic membrane. The second compartment may include the permeate outlet and may be in fluid communication with the permeate side of the ceramic membrane.

A sixth aspect of the present disclosure may include the fifth aspect, in which the first compartment may provide a flow path that fluidly couples the accepted outlet of the at least one hydrocyclone to the membrane inlet of the at least one ceramic membrane.

A seventh aspect of the present disclosure may include any one of the fifth or sixth aspects, in which the separator casing may comprise a third compartment in fluid communication with the retentate outlet of the at least one ceramic membrane and having a greater-density fluid outlet.

An eighth aspect of the present disclosure may include any one of the first through seventh aspects, in which the at least one ceramic membrane may have an average pore size of less than or equal to 0.5 micrometers.

A ninth aspect of the present disclosure may include any one of the first through eighth aspects, in which the at least one ceramic membrane may have an average pore size of from 0.005 micrometers to 0.5 micrometers.

A tenth aspect of the present disclosure may include any one of the first through ninth aspects, where the at least one hydrocyclone may be operable to separate a multi-phase composition comprising a solid phase, an aqueous phase, and an oleaginous phase into a lesser-density fluid and an intermediate fluid and the at least one ceramic membrane may be operable to separate the intermediate fluid into a greater-density fluid and a medium-density fluid. The greater-density fluid may pass out of the retentate outlet of the at least one ceramic membrane and the medium-density fluid may pass through the at least one ceramic membrane to the chamber of the separator casing.

An eleventh aspect of the present disclosure may include any one of the first through tenth aspects, comprising a plurality of hydrocyclones and a plurality of ceramic membranes.

A twelfth aspect of the present disclosure may be directed to a separator system comprising the separator of any one of the first through eleventh aspects. The separator system may further comprise at least one pressure sensor operatively coupled to the hydrocyclone inlet, the reject outlet, the membrane inlet, the retentate outlet of the ceramic membrane, or the separator casing. The separator system may further include at least one control valve operatively coupled to a permeate outlet or a greater-density fluid outlet of the separator casing, at least one processor communicatively coupled to the at least one pressure sensor and the at least one control valve, and at least one memory module communicatively coupled to the processor.

A thirteenth aspect of the present disclosure may include the twelfth aspect, further comprising machine readable instructions stored on the at least one memory module. The machine readable instructions, when executed by the at least one processor, may cause the separator system to measure a pressure of at least one of a multi-phase composition introduced to the at least one hydrocyclone, a lesser-density fluid at the reject outlet, an intermediate fluid passed from the accepted outlet of the at least one hydrocyclone to the membrane inlet, a medium-density fluid in the separator casing, or a greater-density fluid at the greater-density fluid outlet of the separator casing. The machine readable instructions may further cause the separator system to control the at least one control valve based on the measured pressure.

A fourteenth aspect of the present disclosure may include the thirteenth aspect, where the machine readable instructions, when executed by the at least one processor, may cause the separator system to compare the measured pressure against a target pressure for the multi-phase composition introduced to the at least one hydrocyclone, the lesser-density fluid at the reject outlet, the intermediate fluid passed from the accepted outlet of the at least one hydrocyclone to the membrane inlet, the medium-density fluid in the separator casing, or the greater-density fluid at the greater-density fluid outlet of the separator casing. The machine readable instructions may further cause the separator system to control the at least one control valve based on the comparison.

A fifteenth aspect of the present disclosure may include any one of the twelfth through fourteenth aspects, where the at least one pressure sensor may include one or a plurality of a hydrocyclone inlet pressure sensor operatively coupled to the hydrocyclone inlet of the at least one hydrocyclone, a lesser-density fluid pressure sensor operatively coupled to the reject outlet of the at least one hydrocyclone, an intermediate fluid pressure sensor operatively coupled to the membrane inlet, a retentate pressure sensor operatively coupled to the greater-density fluid outlet, or a permeate pressure sensor operatively coupled to the separator casing.

A sixteenth aspect of the present disclosure may include any one of the twelfth through fifteenth aspects, where the at least one control valve may comprise a permeate control valve operatively coupled to the permeate outlet of the separator casing and a retentate control valve operatively coupled to the greater-density fluid outlet.

A seventeenth aspect of the present disclosure may include any one of the twelfth through sixteenth aspects, further comprising a flowrate sensor operatively coupled to the greater-density fluid outlet of the separator casing, where the flowrate sensor may be configured to measure a flowrate of the greater-density fluid at the greater-density fluid outlet of the separator casing.

An eighteenth aspect of the present disclosure may include the seventeenth aspect, comprising machine readable instructions stored on the at least one memory module, where the machine readable instructions, when executed by the at least one processor, may cause the separator system to measure a flowrate of the greater-density fluid passing out of the greater-density fluid outlet of the separator casing, and control the at least one control valve based on the measured flowrate of the greater-density fluid.

A nineteenth aspect of the present disclosure may be directed to a method of separating a multi-phase composition having an aqueous phase, an oleaginous phase, and a solid phase, the method comprising passing the multi-phase composition to the separator of any one of the first through eleventh aspects, where the separator is operable to separate the multi-phase composition into a lesser-density fluid, a medium-density fluid, and a greater-density fluid.

A twentieth aspect of the present disclosure may be directed to a method of separating a multi-phase composition having an aqueous phase, an oleaginous phase, and a solid phase, the method comprising passing the multi-phase composition to a separator operable to separate the multi-phase composition into a lesser-density fluid, a medium-density fluid, and a greater-density fluid. The separator may include a separator casing defining a chamber and having a permeate outlet, at least one hydrocyclone disposed within the separator casing and having an accepted outlet and a reject outlet, and at least one ceramic membrane disposed within the separator casing and downstream of the accepted outlet of the hydrocyclone, the ceramic membrane comprising at least one cylindrical tube, a membrane inlet, a retentate outlet, a retentate side defining the at least one cylindrical tube, and a permeate side, where the permeate side is in fluid communication with the chamber.

A twenty-first aspect of the present disclosure may include the twentieth aspect, in which the separator comprises the separator of any of the first through eleventh aspects.

A twenty-second aspect of the present disclosure may include any one of the nineteenth through twenty-first aspects, further comprising collecting the lesser-density fluid from the reject outlet of the at least one hydrocyclone, collecting the greater-density fluid from the greater-density fluid outlet of the separator casing, and collecting the medium-density fluid from the permeate outlet of the separator casing.

A twenty-third aspect of the present disclosure may include any one of the nineteenth through twenty-second aspects, further comprising measuring a pressure of one or a plurality of the following: the multi-phase composition at the hydrocyclone inlet of the at least one hydrocyclone, the lesser-density fluid at the reject outlet of the at least one hydrocyclone, an intermediate fluid passed from the accepted outlet of the at least one hydrocyclone to the membrane inlet, the medium-density fluid in the separator casing, or the greater-density fluid at the greater-density fluid outlet of the separator casing. The method may further include adjusting a position of a retentate control valve at the greater-density fluid outlet, a permeate control valve at the permeate outlet, a lesser-density fluid control valve at the reject outlet of the at least one hydrocyclone, or combinations of these, based on the measured pressure. Adjusting the position of one or more of the retentate control valve, the permeate control valve, or the lesser-density fluid control valve may increase or decrease the pressure of one or a plurality of the multi-phase composition, the lesser-density fluid, the intermediate fluid, the greater-density fluid, the medium-density fluid, or combinations of these.

A twenty-fourth aspect of the present disclosure may include the twenty-third aspect, further comprising comparing the measured pressure against a target pressure and adjusting a position of the retentate control valve at the greater-density fluid outlet, the permeate control valve at the permeate outlet, the lesser-density fluid control valve at the reject outlet of the at least one hydrocyclone, or combinations of these, based on the comparison.

A twenty-fifth aspect of the present disclosure may include any one of the nineteenth through twenty-fourth aspects, further comprising measuring a flowrate of the greater-density fluid passing out of the greater-density fluid outlet of the separator casing and increasing or decreasing the flowrate of the greater-density fluid from the greater-density fluid outlet based on the measured pressure.

A twenty-sixth aspect of the present disclosure may include the twenty-fifth aspect, further comprising adjusting a position of a permeate control valve at the permeate outlet, a lesser-density fluid control valve at the reject outlet of the at least one hydrocyclone, or both, in response to increasing or decreasing the flowrate of the greater-density fluid from the greater-density fluid outlet. Adjusting the positon of the permeate control valve or the lesser-density fluid control valve may increase or decrease the pressure of one or more of the multi-phase composition, the lesser-density fluid, the intermediate fluid, the greater-density fluid, the medium-density fluid, or combinations of these.

It should now be understood that various aspects of the apparatus, systems, and methods for separating multi-phase compositions, such as produced water, are described and such aspects may be utilized in conjunction with various other aspects.

Throughout this disclosure ranges are provided for various processing parameters and operating conditions for the apparatus, systems, and methods for separating multi-phase compositions and the compositions of various streams and mixtures. It will be appreciated that when one or more explicit ranges are provided the individual values and the sub-ranges formed within the range are also intended to be provided as providing an explicit listing of all possible combinations is prohibitive. For example, a provided range of 1-10 also includes the individual values, such as 1, 2, 3, 4.2, and 6.8, as well as all the ranges that may be formed within the provided bounds, such as 1-8, 2-4, 6-9, and 1.3-5.6.

It is noted that recitations herein of "at least one" component, element, etc., should not be used to create an inference that the alternative use of the articles "a" or "an" should be limited to a single component, element, etc.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

What is claimed is:

1. A separator comprising:
    a separator casing defining a chamber and having a permeate outlet;
    at least one hydrocyclone disposed within the separator casing, the at least one hydrocyclone comprising:
        a hydrocyclone inlet;
        a tapered section downstream of the hydrocyclone inlet;
        a reject outlet proximate a wide end of the tapered section; and
        an accepted outlet proximate a narrow end of the tapered section; and
    at least one ceramic membrane disposed within the separator casing and downstream of the accepted outlet of the hydrocyclone, the ceramic membrane comprising at least one cylindrical tube, a membrane inlet, a retentate outlet, a retentate side defining the at least one cylindrical tube, and a permeate side, where the permeate side is in fluid communication with the chamber.

2. The separator of claim 1, in which the membrane inlet of the at least one ceramic membrane is in fluid communication with the accepted outlet of the at least one hydrocyclone.

3. The separator of claim 1, in which the at least one ceramic membrane comprises a plurality of cylindrical tubes extending from the membrane inlet to the retentate outlet.

4. The separator of claim 1, in which the separator comprises a plurality of ceramic membranes, where the membrane inlet of each of the plurality of ceramic membranes is in fluid communication with the accepted outlet of the at least one hydrocyclone and the permeate side of each of the plurality of ceramic membranes is in fluid communication with the chamber.

5. The separator of claim 1, in which the separator casing comprises one or a plurality of internal walls dividing the chamber into at least a first compartment and a second compartment, in which:
    the first compartment is in fluid communication with the accepted outlet of the at least one hydrocyclone and the membrane inlet of the at least one ceramic membrane; and
    the second compartment comprises the permeate outlet and is in fluid communication with the permeate side of the ceramic membrane.

6. The separator of claim 5, in which the first compartment provides a flow path that fluidly couples the accepted outlet of the at least one hydrocyclone to the membrane inlet of the at least one ceramic membrane.

7. The separator of claim 5, in which the separator casing comprises a third compartment in fluid communication with the retentate outlet of the at least one ceramic membrane and having a greater-density fluid outlet.

8. The separator of claim 1, in which the at least one ceramic membrane comprises an average pore size of less than or equal to 0.5 micrometers.

9. The separator of claim 1, where the at least one hydrocyclone is operable to separate a multi-phase composition comprising a solid phase, an aqueous phase, and an oleaginous phase into a lesser-density fluid and an intermediate fluid and the at least one ceramic membrane is operable to separate the intermediate fluid into a greater-density fluid and a medium-density fluid, where the greater-density fluid passes out of the retentate outlet of the at least one ceramic membrane and the medium-density fluid passes through the at least one ceramic membrane to the chamber of the separator casing.

10. The separator of claim 1, comprising a plurality of hydrocyclones and a plurality of ceramic membranes.

11. A separator system comprising:
    the separator of claim 1;
    at least one pressure sensor operatively coupled to the hydrocyclone inlet, the reject outlet, the membrane inlet, the retentate outlet of the ceramic membrane, or the separator casing;
    at least one control valve operatively coupled to a permeate outlet or a greater-density fluid outlet of the separator casing;
    at least one processor communicatively coupled to the at least one pressure sensor and the at least one control valve; and
    at least one memory module communicatively coupled to the processor.

12. The separator system of claim 11, further comprising machine readable instructions stored on the at least one memory module, where the machine readable instructions, when executed by the at least one processor, cause the separator system to:
    measure a pressure of at least one of a multi-phase composition introduced to the at least one hydrocyclone, a lesser-density fluid at the reject outlet, an intermediate fluid passed from the accepted outlet of the at least one hydrocyclone to the membrane inlet, a medium-density fluid in the separator casing, or a greater-density fluid at the greater-density fluid outlet of the separator casing; and
    control the at least one control valve based on the measured pressure.

13. The separator system of claim 12, where the at least one pressure sensor comprises one or a plurality of:
    a hydrocyclone inlet pressure sensor operatively coupled to the hydrocyclone inlet of the at least one hydrocyclone;
    a lesser-density fluid pressure sensor operatively coupled to the reject outlet of the at least one hydrocyclone;
    an intermediate fluid pressure sensor operatively coupled to the membrane inlet;
    a retentate pressure sensor operatively coupled to the greater-density fluid outlet; or
    a permeate pressure sensor operatively coupled to the separator casing.

14. The separator system of claim 12, where the at least one control valve comprises a permeate control valve operatively coupled to the permeate outlet of the separator casing and a retentate control valve operatively coupled to the greater-density fluid outlet.

15. The separator system of claim 12, further comprising:
    a flowrate sensor operatively coupled to the greater-density fluid outlet of the separator casing, where the flowrate sensor is configured to measure a flowrate of the greater-density fluid at the greater-density fluid outlet of the separator casing; and
    machine readable instructions stored on the at least one memory module, where the machine readable instructions, when executed by the at least one processor, cause the separator system to:

measure a flowrate of the greater-density fluid passing out of the greater-density fluid outlet of the separator casing; and control the at least one control valve based on the measured flowrate of the greater-density fluid.

16. A method of separating a multi-phase composition having an aqueous phase, an oleaginous phase, and a solid phase, the method comprising passing the multi-phase composition to a separator operable to separate the multi-phase composition into a lesser-density fluid, a medium-density fluid, and a greater-density fluid, the separator comprising:

a separator casing defining a chamber and having a permeate outlet;

at least one hydrocyclone disposed within the separator casing and having an accepted outlet and a reject outlet; and at least one ceramic membrane disposed within the separator casing and downstream of the accepted outlet of the hydrocyclone, the ceramic membrane comprising at least one cylindrical tube, a membrane inlet, a retentate outlet, a retentate side defining the at least one cylindrical tube, and a permeate side, where the permeate side is in fluid communication with the chamber.

17. The method of claim 16, further comprising:
collecting the lesser-density fluid from the reject outlet of the at least one hydrocyclone;
collecting the greater-density fluid from a greater-density fluid outlet of the separator casing; and
collecting the medium-density fluid from the permeate outlet of the separator casing.

18. The method of claim 16, further comprising:
measuring a pressure of one or a plurality of the following:
the multi-phase composition at a hydrocyclone inlet of the at least one hydrocyclone;
the lesser-density fluid at the reject outlet of the at least one hydrocyclone;
an intermediate fluid passed from the accepted outlet of the at least one hydrocyclone to the membrane inlet;
the medium-density fluid in the separator casing; or
the greater-density fluid at a greater-density fluid outlet of the separator casing; and adjusting a position of a retentate control valve at the greater-density fluid outlet, a permeate control valve at the permeate outlet, a lesser-density fluid control valve at the reject outlet of the at least one hydrocyclone, or combinations of these, based on the measured pressure, where adjusting the position of one or more of the retentate control valve, the permeate control valve, or the lesser-density fluid control valve increases or decreases the pressure of one or a plurality of the multi-phase composition, the lesser-density fluid, the intermediate fluid, the greater-density fluid, the medium-density fluid, or combinations of these.

19. The method of claim 16, further comprising:
measuring a flowrate of the greater-density fluid passing out of a greater-density fluid outlet of the separator casing; and
increasing or decreasing the flowrate of the greater-density fluid from the greater-density fluid outlet based on the measured flowrate.

20. The method of claim 19, further comprising adjusting a position of a permeate control valve at the permeate outlet, a lesser-density fluid control valve at the reject outlet of the at least one hydrocyclone, or both, in response to increasing or decreasing the flowrate of the greater-density fluid from the greater-density fluid outlet, where adjusting the position of the permeate control valve or the lesser-density fluid control valve increases or decreases a pressure of one or more of the multi-phase composition, the lesser-density fluid, an intermediate fluid, the greater-density fluid, the medium-density fluid, or combinations of these.

* * * * *